(12) United States Patent
Blumenberg et al.

(10) Patent No.: US 8,464,182 B2
(45) Date of Patent: Jun. 11, 2013

(54) DEVICE, METHOD, AND GRAPHICAL USER INTERFACE FOR PROVIDING MAPS, DIRECTIONS, AND LOCATION-BASED INFORMATION

(75) Inventors: Chris Blumenberg, San Francisco, CA (US); Kimon Tsinteris, San Francisco, CA (US); Richard Williamson, Los Gatos, CA (US); Ryan Staake, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 663 days.

(21) Appl. No.: 12/566,668

(22) Filed: Sep. 25, 2009

(65) Prior Publication Data

US 2010/0309149 A1    Dec. 9, 2010

Related U.S. Application Data

(60) Provisional application No. 61/184,828, filed on Jun. 7, 2009.

(51) Int. Cl.
*G06F 3/033* (2006.01)
(52) U.S. Cl.
USPC ............ 715/863; 715/864; 345/173; 382/103
(58) Field of Classification Search
USPC .................. 715/786, 787, 863, 864; 345/173, 345/179; 455/456.1; 382/103; 701/207–212
See application file for complete search history.

(56) References Cited

U.S. PATENT DOCUMENTS 5,416,890 A    5/1995 Beretta .................... 395/131

(Continued)

FOREIGN PATENT DOCUMENTS

DE    10 2005 047 648 A1    4/2007
DE    10 2008 008948 A1    8/2009

(Continued)

OTHER PUBLICATIONS

AV Bros., "AV Bros. Page Curl 2.0 for Windows and Mac OS X," AV Bros. Curl 2.0 User Guide, 2004, 26 pages, http://c0002649.cdn2.cloudfiles.rackspacecloud.com/avpagecurl20.pdf.

(Continued)

*Primary Examiner* — Kieu Vu
*Assistant Examiner* — James T Durkin
(74) *Attorney, Agent, or Firm* — Morgan, Lewis & Bockius LLP

(57) ABSTRACT

In accordance with some embodiments, a portable electronic device with a touch screen display displays a map in an untracked mode of a mapping application. The device receives location information for the device, and detects a first activation of a mapping mode user interface element. In response, the device enters a tracked mode of the mapping application. While in the tracked mode of the mapping application, the device detects a second activation of the mapping mode user interface element and, in response, enters a heading mode of the mapping application. While in the heading mode of the mapping application, the device detects a finger scrolling gesture and, in response, the device enters the tracked mode when the finger scrolling gesture moves the map less than a predefined amount or the device enters the untracked mode when the finger scrolling gesture moves the map greater than the predefined amount.

21 Claims, 29 Drawing Sheets

U.S. PATENT DOCUMENTS

| | | | | |
|---|---|---|---|---|
| 5,608,635 | A | 3/1997 | Tamai | |
| 5,760,767 | A | 6/1998 | Shore et al. | 345/328 |
| 5,825,352 | A | 10/1998 | Bisset et al. | |
| 5,877,751 | A | 3/1999 | Kanemitsu et al. | 345/173 |
| 6,009,462 | A | 12/1999 | Birrell et al. | |
| 6,040,824 | A | 3/2000 | Maekawa et al. | |
| 6,115,025 | A | 9/2000 | Buxton et al. | |
| 6,380,931 | B1 | 4/2002 | Gillespie et al. | |
| 6,512,529 | B1* | 1/2003 | Janssen et al. | 715/790 |
| 6,600,502 | B1 | 7/2003 | Brewster, Jr. | |
| 6,667,751 | B1 | 12/2003 | Wynn et al. | |
| 6,687,613 | B2* | 2/2004 | Yokota | 701/428 |
| 6,983,203 | B1 | 1/2006 | Wako | 701/208 |
| 7,032,187 | B2 | 4/2006 | Keely, Jr. et al. | |
| 7,046,230 | B2 | 5/2006 | Zadesky et al. | |
| 7,047,113 | B1 | 5/2006 | Burch et al. | |
| 7,366,609 | B2 | 4/2008 | Lee | |
| 7,376,640 | B1 | 5/2008 | Anderson et al. | |
| 7,379,811 | B2 | 5/2008 | Rasmussen et al. | |
| 7,439,969 | B2 | 10/2008 | Chithambaram et al. | |
| 7,479,949 | B2 | 1/2009 | Jobs et al. | |
| 7,484,180 | B2 | 1/2009 | McCormack et al. | |
| 7,495,659 | B2 | 2/2009 | Marriott et al. | |
| 7,499,040 | B2 | 3/2009 | Zadesky et al. | |
| 7,640,100 | B2 | 12/2009 | Spinelli | |
| 7,656,393 | B2 | 2/2010 | King et al. | |
| 7,663,607 | B2 | 2/2010 | Hotelling et al. | |
| 7,676,767 | B2 | 3/2010 | Hofmeister et al. | |
| 7,728,821 | B2* | 6/2010 | Hillis et al. | 345/173 |
| 7,768,395 | B2 | 8/2010 | Gold | |
| 7,797,642 | B1 | 9/2010 | Karam et al. | |
| 7,800,592 | B2 | 9/2010 | Kerr et al. | |
| 7,808,479 | B1 | 10/2010 | Hotelling et al. | |
| 7,812,826 | B2 | 10/2010 | Ording et al. | |
| 7,831,917 | B1 | 11/2010 | Karam | |
| 7,890,886 | B2 | 2/2011 | Matthews et al. | |
| 7,891,103 | B2* | 2/2011 | Mayor et al. | 33/356 |
| 7,907,124 | B2* | 3/2011 | Hillis et al. | 345/173 |
| 7,945,546 | B2 | 5/2011 | Bliss et al. | |
| 8,095,303 | B1 | 1/2012 | Nesbitt et al. | |
| 8,171,432 | B2 | 5/2012 | Matas et al. | |
| 2001/0020211 | A1 | 9/2001 | Takayama et al. | |
| 2001/0045949 | A1 | 11/2001 | Chithambaram et al. | |
| 2002/0087262 | A1 | 7/2002 | Bullock et al. | |
| 2002/0183924 | A1 | 12/2002 | Yokota | |
| 2003/0054830 | A1* | 3/2003 | Williams et al. | 455/456 |
| 2003/0177265 | A1 | 9/2003 | Page et al. | |
| 2004/0243307 | A1 | 12/2004 | Geelen | 701/213 |
| 2005/0114021 | A1 | 5/2005 | Krull et al. | 701/211 |
| 2005/0239478 | A1* | 10/2005 | Spirito | 455/456.1 |
| 2005/0251331 | A1 | 11/2005 | Kreft | 701/207 |
| 2006/0026521 | A1 | 2/2006 | Hotelling et al. | |
| 2006/0026535 | A1 | 2/2006 | Hotelling et al. | |
| 2006/0026536 | A1 | 2/2006 | Hotelling et al. | |
| 2006/0047416 | A1 | 3/2006 | Goldberg et al. | |
| 2006/0143574 | A1 | 6/2006 | Ito et al. | |
| 2006/0181517 | A1 | 8/2006 | Zadesky et al. | |
| 2006/0197753 | A1 | 9/2006 | Hotelling | |
| 2006/0224311 | A1 | 10/2006 | Watanabe et al. | |
| 2006/0239248 | A1 | 10/2006 | Hawk et al. | |
| 2006/0284852 | A1 | 12/2006 | Hofmeister et al. | |
| 2007/0080958 | A1* | 4/2007 | Chithambaram et al. | 345/418 |
| 2007/0124062 | A1 | 5/2007 | Janky et al. | |
| 2007/0168888 | A1 | 7/2007 | Jawerth | |
| 2007/0176796 | A1* | 8/2007 | Bliss et al. | 340/995.14 |
| 2007/0189737 | A1 | 8/2007 | Chaudhri et al. | |
| 2007/0225904 | A1* | 9/2007 | Pantalone et al. | 701/207 |
| 2007/0236477 | A1* | 10/2007 | Ryu et al. | 345/173 |
| 2007/0273664 | A1 | 11/2007 | Kim et al. | |
| 2008/0036743 | A1 | 2/2008 | Westerman et al. | |
| 2008/0040315 | A1 | 2/2008 | Auerbach et al. | |
| 2008/0055263 | A1 | 3/2008 | Lemay et al. | |
| 2008/0055269 | A1 | 3/2008 | Lemay et al. | |
| 2008/0086356 | A1 | 4/2008 | Glassman et al. | |
| 2008/0088602 | A1 | 4/2008 | Hotelling | |
| 2008/0122796 | A1 | 5/2008 | Jobs et al. | |
| 2008/0147730 | A1* | 6/2008 | Lee et al. | 707/104.1 |
| 2008/0165153 | A1 | 7/2008 | Platzer et al. | |
| 2008/0167809 | A1 | 7/2008 | Geelen | |
| 2008/0168396 | A1 | 7/2008 | Matas et al. | |
| 2008/0172357 | A1 | 7/2008 | Rechis et al. | |
| 2008/0208456 | A1* | 8/2008 | Jouline et al. | 701/208 |
| 2008/0228386 | A1* | 9/2008 | Geelen et al. | 701/201 |
| 2008/0320391 | A1 | 12/2008 | Lemay et al. | |
| 2008/0320419 | A1* | 12/2008 | Matas et al. | 715/863 |
| 2009/0024590 | A1 | 1/2009 | Sturge et al. | |
| 2009/0058820 | A1 | 3/2009 | Hinckley | |
| 2009/0064055 | A1 | 3/2009 | Chaudhri et al. | |
| 2009/0172599 | A1* | 7/2009 | Nezu | 715/841 |
| 2009/0177385 | A1 | 7/2009 | Matas et al. | |
| 2009/0178007 | A1 | 7/2009 | Matas et al. | |
| 2009/0244023 | A1 | 10/2009 | Kim et al. | |
| 2009/0281724 | A1 | 11/2009 | Blumenberg et al. | |
| 2009/0295753 | A1 | 12/2009 | King et al. | |
| 2010/0031186 | A1 | 2/2010 | Tseng et al. | |
| 2010/0225607 | A1 | 9/2010 | Kim | |
| 2010/0293186 | A1 | 11/2010 | Nambata et al. | |
| 2010/0312462 | A1 | 12/2010 | Guéziec et al. | |
| 2011/0041084 | A1 | 2/2011 | Karam | |
| 2011/0045868 | A1 | 2/2011 | Sheha et al. | |
| 2012/0011137 | A1 | 1/2012 | Sheha et al. | |

FOREIGN PATENT DOCUMENTS

| | | |
|---|---|---|
| EP | 0 908 835 A2 | 4/1999 |
| EP | 1 653 376 A2 | 5/2006 |
| EP | 1 840 511 A1 | 10/2007 |
| WO | WO 97/07467 A1 | 2/1997 |
| WO | WO 98/07112 A2 | 2/1998 |
| WO | WO 03/017120 A1 | 2/2003 |
| WO | WO 2004/076977 A1 | 9/2004 |
| WO | WO 2005/104039 A2 | 11/2005 |
| WO | WO 2009/002942 A2 | 12/2008 |

OTHER PUBLICATIONS

Dornfest. "Google Hacks." Third Edition, Aug. 3, 2006, O'Reilly Media, Inc., 5 pages.

Google, "Google Maps Shows Real-Time Traffic Data," Google Operating System, Feb. 28, 2007, 1 pg., http://googlesystem.blogspot.com/2007/02/google-maps-shows-real-time-traffic.html.

Gralla, "Google™ Search and Tools in a Snap," Sams, Apr. 4, 2006, 15 pages.

Holthe et al., "Video Browsing Techniques for Web Interfaces," 2005, 5 pages, http://ieeexplore.ieee.org/Xplore/login.jsp?url=http%3A%2F%2Fieeexplore.ieee.org%2Fstamp.jsp%3Farnumber%3D01593233&authDecision=-203.

Mio, MioMap v 3.2 User Manual—Navigation software for Mio DigiWalker C310, Aug. 2006 (v1.00), US English version, http://www.gpspassion.com/upload/MioMap_englishUS.pdf, 84 pages.

Mol, H., "Plan Your Trip With Google Maps," Visual Steps, Dec. 2009, 36 pages, http://www.visualsteps.com/downloads/Free_guide_google_maps.pdf.

Invitation to Pay Additional Fees dated Dec. 1, 2011, which corresponds to U.S. Appl. No. 12/788,281 (van Os).

Office Action dated Feb. 25, 2011, received in U.S. Appl. No. 11/969,211 (Matas).

Final Office Action dated Aug. 17, 2011, received in U.S. Appl. No. 11/969,211 (Matas).

Office Action dated Jan. 25, 2011, received in U.S. Appl. No. 12/143,741 (Matas).

Notice of Allowance dated Jul. 12, 2011, received in U.S. Appl. No. 12/143,741 (Matas).

Office Action dated May 17, 2011, received in U.S. Appl. No. 12/143,752 (Matas).

Carew, S., "Phones that tell you where to Drive, Meet, Eat," 2 pages, May 26, 2007.

Dalrymple, J., "Google Maps Adds Locator, but not for iPhone," 2007, 1 page, http://news.yahoo.com/s/macworld/20071130/tc_macworld/googlemaps20071130_0&printer=1; ylt+Auvf3s6LQK_p)ajtb954T.

Flipping Book, "Premium Page Flipping," Flipping Book.com, downloaded Nov. 12, 2009, 1 page, http://web.archive.org/web/20041207072330/http://www.page-flip.com/.

Google, "Review Guide-Google Maps for Mobile (Beta)," 7 pages, 2006.

iPhone Hacks, "iPhone Software/Hardware Hack: LocoGPS—GPS Add-on for the iPhone," 41 pages, Dec. 25, 2007, http://www.iphonehacks.com/iphone_applications/index.html.

Mio, "User's Manual MioMap 2.0," Mio Technology, Aug. 2005, http://web.archive.org/web/200612140000736/http://www.mio-tech.be/Manuals/269+/MioMapV2-.

Mio, Mio 269+ User's Manual, Mio Technology, Aug. 2005, http://www.mio-tech.be/Manuals/269+/Device-Manual/268-plus-269-plus-Device-Manual-EN.pdf.

Mio, "27 Countries in Your Pocket," Mio Technology, Sep. 2005, http://www.mio-tech.be/en/printview/press-release-2005-09-29.htm.

Navizon, "FAQ, Peer-to Peer Wireless Positioning," 8 pages, Nov. 30, 2007, http://www.navizon.com/FAQ.htm.

Navizon, "How it Works," 7 pages, Nov. 30, 2007, http://www.navizon.com/FullFeatures.htm.

Navizon, "The First Positioning System that Combines GPS, WiFi and Phone Positioning," 2 pages, Nov. 30, 2007, http://www.navizon.com.

Tidwell, J., "Animated Transition," from Designing Interfaces, O'Reilly Media, Inc., Nov. 2005, pp. 84-85.

Waypoints Maplist View, "Featured Projects," Jun. 14, 2007, 3 pages, http://eric.wahlforss.com/folio.

Windows Mobile 6, "Fact Sheet," 2 pages, 2007, www.WindowsMobile.com.

Windows Mobile 6 Professional Video Tour, Mar. 11, 2007, 4 pages, http://gizmodo.com/gadges/cellphones/windows-mobile-6-professional-video-tour-237039.php.

Windows Mobile Map Contact List, "Windows Live Search for Mobile Goes Final, Still Great," Mar. 11, 2007, http://gizmodo.com/gadgets/software/windows-live-search-for-mobile-goes-final-still-great-236002.php.

Invitation to Pay Additional Fees dated Jul. 29, 2008, received in International Application No. PCT/US2008/050295, which corresponds to U.S. Appl. No. 11/969,211.

International Search Reort and Written Opinion dated Jan. 14, 2009, received in International Application No. PCT/US2008/050295, which corresponds to U.S. Appl. No. 11/969,211.

Invitation to Pay Additional Fees dated Oct. 13, 2008, received in International Application No. PCT/US2008/067925, which corresponds to U.S. Appl. No. 12/143,752.

International Search Report and Written Opinion dated Dec. 17, 2008, received in International Application No. PCT/US2008/067925, which corresponds to U.S. Appl. No. 12/143,752.

International Preliminary Report on Patentability dated Jan. 7, 2010, received in International Application No. PCT/US2008/067925, which corresponds to U.S. Appl. No. 12/143,752.

Tidwell J., "Designing Interfaces," Copyright © 2006 O'Reilly Media, Inc., 348 pages.

Westerman, W., "Hand Tracking Finger Identification and Chordic Manipulation on a Multi-touch Surface," Doctoral Dissertation, submitted Spring 1999, 363 pages.

Notice of Allowance dated Dec. 30, 2011, received in U.S. Appl. No. 12/143,741, 7 pages (Matas).

Final Office Action dated Dec. 23, 2011, received in U.S. Appl. No. 12/143,752, 20 pages (Matas).

Office Action dated Feb. 17, 2012, received in U.S. Appl. No. 12/788,281, 14 pages (van Os).

Apple.com, "Maps with GPS," Apple.com May 2009, http://www.apple.com/iphone/feature/maps.html, 2 pages.

Google, "Google Maps in Search History," Apr. 2005, http://googlesystem.blogspot.com/2006/11/google-maps-in-search-history.html, 1 page.

Kim, "Video-In and Magnetometers Could Introduce Interesting iPhone App Possibilities," Mac Rumors, Apr. 8, 2009, http://www.macrumors.com/2009/04/08/video-in-and-magnetometers-could-introduce-interesting-iphone-app-possibilites/, 5 pages.

The Boy Genius, "Magnetometer in next iPhone confirmed?" The Boy Genius Report, May 7, 2009, http://www.boygeniusreport.com/2009/05/07/magnetometer-in-next-iphone-confirmed/, 15 pages.

YouTube, "G-Map for iPhone: About menus and basic functions," at 1:37/5:49 Heading up Map View Mode, 5:49 video uploaded to YouTube by navi0808, on Feb. 24, 2009, http://www.youtube.com/watch?v=tN8uW__rM0Q, 1 page.

YouTube, "G-Map for iPhone: About menus and basic functions, " at 1:45/5:49 North-up Map View Mode, 5:49 video uploaded to Youtube by navi0808, on Feb. 24, 2009, http://www.youtube.com/watch?v=tN8uW__rM0Q, 1 page.

YouTube, "G-Map for iPhone Demo: 3-Way Map Mode," at 1:03/1:34 Heading-up Mode, 1.34 video uploaded to YouTube by navi0808, on Feb. 13, 2009, http://www.youtube.com/watch?v=QQusXarl&feature=related, 2 pages.

YouTube, "G-Map U.S. iPhone Review," 6:29 video uploaded to YouTube by TapCritic, on Mar. 10, 2009, http://www.youtube.com/watch?v=xrWUKwXQwlQ&feature=related, 1 page.

International Search Report and Written Opinion dated Apr. 12, 2012, received in International Application No. PCT/US2010/020229, which corresponds to US. Appl. No. 12/788,281, 18 pages (van Os).

Office Action dated Sep. 20, 2012, received in U.S. Appl. No. 11/969,211, 30 pages (Matas).

Notice of Allowance dated Sep. 17, 2002, received in U.S. Appl. No. 12/143,752, 13 pages (Matas).

* cited by examiner

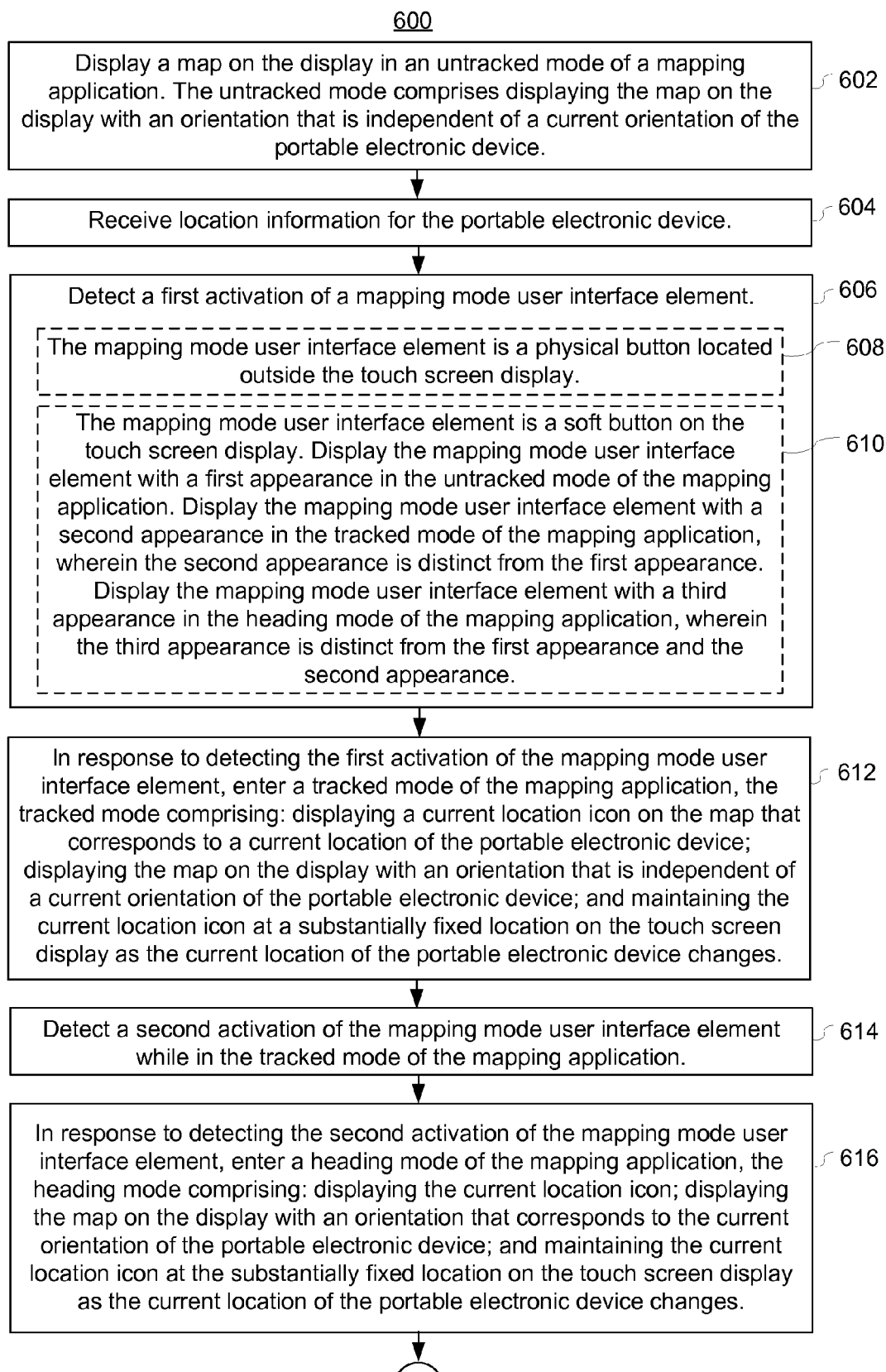

While in the mapping application: perform a search; receive one or more results of the search; detect a user selection from the one or more results of the search; enter the heading mode; and display the current location icon with a heading indicator in the heading mode. The heading indicator includes an arc that corresponds to the orientation of the device. An angular range of the arc varies in accordance with an orientation of the device with respect to the selected search result. ⟵ 632

Update the angular range of the arc as the orientation of the device changes. ⟵ 634

Update the angular range of the arc as the location of the device changes. ⟵ 636

While in the mapping application: perform a search; receive one or more results of the search; detect a user selection from the one or more results of the search; enter the heading mode; and display the current location icon with a heading indicator in the heading mode. The heading indicator includes an arc that corresponds to the orientation of the device. An angular range of the arc varies in accordance with an orientation of the device with respect to a route to the selected search result. ⟵ 638

Update the angular range of the arc as the orientation of the device changes. ⟵ 640

Update the angular range of the arc as the location of the device changes. ⟵ 642

Detect a third activation of the mapping mode button while in the heading mode of the mapping application and, in response to detecting the third activation of the mapping mode button, enter the untracked mode of the mapping application. ⟵ 644

Detect a third activation of the mapping mode button while in the heading mode of the mapping application and, in response to detecting the third activation of the mapping mode button, enter the tracked mode of the mapping application. ⟵ 646

Figure 6C

DEVICE, METHOD, AND GRAPHICAL USER INTERFACE FOR PROVIDING MAPS, DIRECTIONS, AND LOCATION-BASED INFORMATION

RELATED APPLICATIONS

This application claims priority to U.S. Provisional Patent Application No. 61/184,828, "Device, Method, and Graphical User Interface for Providing Maps, Directions, and Location-Based Information," filed Jun. 7, 2009, which is incorporated by reference herein in its entirety.

TECHNICAL FIELD

The disclosed embodiments relate generally to electronic devices with displays and touch-sensitive surfaces that execute mapping applications. More particularly, the disclosed embodiments relate to portable electronic devices with touch screen displays that execute mapping applications with multiple viewing modes.

BACKGROUND

Portable electronic devices that execute mapping applications to provide map and routing information have become quite popular recently. The devices typically include map control functions, capabilities for searching for and displaying points of interest, and capabilities for displaying routes from a current location to a search result.

Mapping applications on such devices typically allow the mapping information to be viewed in a variety of ways, such as with the top of the map corresponding to a fixed direction (e.g., north), the top of the map corresponding to a current heading, the map centered on the current location of the device, the map displaying search results, the map displaying routing information, etc.

Unfortunately, selecting and changing map viewing modes on existing devices is cumbersome and not intuitive, thereby creating a significant cognitive burden on a user. In addition, existing methods take longer than necessary, thereby wasting energy. This latter consideration is particularly important in battery-operated devices.

Accordingly, there is a need for potable electronic devices with faster, more efficient and intuitive methods for changing between map viewing modes. Such methods and interfaces reduce the cognitive burden on a map user and produce a more efficient human-machine interface. For battery-operated devices, such methods and interfaces conserve power and increase the time between battery charges.

SUMMARY

The above deficiencies and other problems associated with user interfaces for electronic devices with mapping applications are reduced or eliminated by the disclosed devices. The device is portable (e.g., a handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, in addition to mapping, the functions may include one or more of: image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some embodiments, a method is performed at a portable electronic device with a touch screen display and a magnetometer. The method includes displaying a map on the display in an untracked mode of a mapping application, the untracked mode comprising displaying the map on the display with an orientation that is independent of a current orientation of the portable electronic device. The method also receives location information for the portable electronic, and detects a first activation of a mapping mode user interface element. In response to detecting the first activation of the mapping mode user interface element, the method includes entering a tracked mode of the mapping application, the tracked mode comprising: displaying a current location icon on the map that corresponds to a current location of the portable electronic device; displaying the map on the display with an orientation that is independent of a current orientation of the portable electronic device; and maintaining the current location icon at a substantially fixed location on the touch screen display as the current location of the portable electronic device changes. While in the tracked mode of the mapping application, the method includes detecting a second activation of the mapping mode user interface element, and in response to detecting the second activation of the mapping mode user interface element, the method includes entering a heading mode of the mapping application, the heading mode comprising: displaying the current location icon; displaying the map on the display with an orientation that corresponds to the current orientation of the portable electronic determined with the magnetometer; and maintaining the current location icon at the substantially fixed location on the touch screen display as the current location of the portable electronic device changes. While in the heading mode of the mapping application, the method includes detecting a finger scrolling gesture on the touch screen display and, in response to detecting the finger scrolling gesture on the touch screen display, the method includes entering the tracked mode of the mapping application when the finger scrolling gesture moves the map less than a predefined amount on the touch screen display, and entering the untracked mode of the mapping application when the finger scrolling gesture moves the map greater than the predefined amount on the touch screen display.

In some embodiments, a graphical user interface ("GUI") is provided on a portable electronic device with a touch screen display and a magnetometer. The GUI comprises a map in a mapping application; a mapping mode user interface element; an untracked mode of the mapping application; a tracked mode of the mapping application; and a heading mode of the mapping application. The untracked mode of the mapping application comprises displaying the map on the display with an orientation that is independent of a current orientation of the portable electronic device. The tracked mode of the mapping application comprises: displaying a current location icon on the map that corresponds to a current location of the portable electronic device; displaying the map on the display with an orientation that is independent of a current orientation of the portable electronic device; and maintaining the current location icon at a substantially fixed location on the touch screen display as the current location of the portable electronic device changes. The heading mode of the mapping application comprises: displaying the current location icon; displaying the map on the display with an orientation that corresponds to the current orientation of the portable electronic determined with the magnetometer; and maintaining the current location icon at the substantially fixed location on the touch screen display as the current location of the portable electronic device changes. The map is displayed on the display in the untracked mode of the mapping application. Location information is received for the portable electronic device. In response to detecting a first activation of the mapping mode user interface element, the tracked mode of the mapping application is entered. While in the tracked mode of the mapping application, in response to detecting a second activation of the mapping mode user interface element, the heading mode of the mapping application is entered. While in the heading mode of the mapping application, in response to detecting a finger scrolling gesture on the touch screen display: the tracked mode of the mapping application is entered when the finger scrolling gesture moves the map less than a predefined amount on the touch screen display, and the untracked mode of the mapping application is entered when the finger scrolling gesture moves the map greater than the predefined amount on the touch screen display.

In some embodiments, a portable electronic device is provided which comprises a touch screen display; one or more processors; memory; and one or more programs, wherein the one or more programs are stored in the memory and configured to be executed by the one or more processors. The one or more programs include instructions for: displaying a map on the display in an untracked mode of a mapping application, the untracked mode comprising displaying the map on the display with an orientation that is independent of a current orientation of the portable electronic device; receiving location information for the portable electronic; and detecting a first activation of a mapping mode user interface element. In response to detecting the first activation of the mapping mode user interface element, the one or more programs include instructions for: entering a tracked mode of the mapping application, the tracked mode comprising: displaying a current location icon on the map that corresponds to a current location of the portable electronic device; displaying the map on the display with an orientation that is independent of a current orientation of the portable electronic device; and maintaining the current location icon at a substantially fixed location on the touch screen display as the current location of the portable electronic device changes. While in the tracked mode of the mapping application, the one or more programs include instructions for detecting a second activation of the mapping mode user interface element, and in response to detecting the second activation of the mapping mode user interface element, the one or more programs include instructions for entering a heading mode of the mapping application, the heading mode comprising: displaying the current location icon; displaying the map on the display with an orientation that corresponds to the current orientation of the portable electronic determined with the magnetometer; and maintaining the current location icon at the substantially fixed location on the touch screen display as the current location of the portable electronic device changes. While in the heading mode of the mapping application, the one or more programs include instructions for detecting a finger scrolling gesture on the touch screen display, and in response to detecting the finger scrolling gesture on the touch screen display while in the heading mode, the one or more programs include instructions for: entering the tracked mode of the mapping application when the finger scrolling gesture moves the map less than a predefined amount on the touch screen display, and entering the untracked mode of the mapping application when the finger scrolling gesture moves the map greater than the predefined amount on the touch screen display.

In some embodiments, a computer readable storage medium storing one or more programs is provided. The one or more programs comprise instructions, which when executed by a portable electronic device with a touch screen display, cause the device to: display a map on the display in an untracked mode of a mapping application, the untracked mode comprising displaying the map on the display with an orientation that is independent of a current orientation of the portable electronic device; receive location information for the portable electronic device; and detect a first activation of a mapping mode user interface element. In response to detecting the first activation of the mapping mode user interface element, the computer readable storage medium comprises further instructions which when executed, cause the device to: enter a tracked mode of the mapping application, the tracked mode comprising: displaying a current location icon on the map that corresponds to a current location of the portable electronic device; displaying the map on the display with an orientation that is independent of a current orientation of the portable electronic device; and maintaining the current location icon at a substantially fixed location on the touch screen display as the current location of the portable electronic device changes. While in the tracked mode of the mapping application, the computer readable storage medium comprises further instructions which when executed, cause the device to: detect a second activation of the mapping mode user interface element, and in response to detecting the second activation of the mapping mode user interface element, enter a heading mode of the mapping application, the heading mode comprising: displaying the current location icon; displaying the map on the display with an orientation that corresponds to the current orientation of the portable electronic determined with the magnetometer; and maintaining the current location icon at the substantially fixed location on the touch screen display as the current location of the portable electronic device changes. While in the heading mode of the mapping application, the computer readable storage medium comprises further instructions which when executed, cause the device to: detect a finger scrolling gesture on the touch screen display, and in response to detecting the finger scrolling gesture on the touch screen display, the computer readable storage medium comprises further instructions which when executed, cause the device to: enter the tracked mode of the mapping application when the finger scrolling gesture moves the map less than a predefined amount on the touch screen display, and enter the untracked mode of the mapping application when the finger scrolling gesture moves the map greater than the predefined amount on the touch screen display.

In some embodiments, a portable electronic device is provided which comprises a touch screen display and means for displaying a map on the display in an untracked mode of a mapping application, the untracked mode comprising displaying the map on the display with an orientation that is independent of a current orientation of the portable electronic device; and means for receiving location information for the portable electronic device. The portable electronic device further comprises means for detecting a first activation of a mapping mode user interface element, and in response to detecting the first activation of the mapping mode user interface element, entering a tracked mode of the mapping application, the tracked mode comprising: means for displaying a current location icon on the map that corresponds to a current location of the portable electronic device; means for displaying the map on the display with an orientation that is independent of a current orientation of the portable electronic device; and means for maintaining the current location icon at a substantially fixed location on the touch screen display as the current location of the portable electronic device changes. While in the tracked mode of the mapping application, the portable electronic device further comprises means for detecting a second activation of the mapping mode user interface element, and in response to detecting the second activation of the mapping mode user interface element, means for entering a heading mode of the mapping application, the heading mode comprising: means for displaying the current location icon; means for displaying the map on the display with an orientation that corresponds to the current orientation of the portable electronic determined with the magnetometer; and means for maintaining the current location icon at the substantially fixed location on the touch screen display as the current location of the portable electronic device changes. While in the heading mode of the mapping application, the portable electronic device further comprises means for detecting a finger scrolling gesture on the touch screen display, and in response to detecting the finger scrolling gesture on the touch screen display: means for entering the tracked mode of the mapping application when the finger scrolling gesture moves the map less than a predefined amount on the touch screen display, and means for entering the untracked mode of the mapping application when the finger scrolling gesture moves the map greater than the predefined amount on the touch screen display.

In some embodiments, an information processing apparatus is provided for use in a portable electronic device with a touch screen display, the information processing apparatus comprising means for displaying a map on the display in an untracked mode of a mapping application, the untracked mode comprising displaying the map on the display with an orientation that is independent of a current orientation of the portable electronic device; and means for receiving location information for the portable electronic device. The information processing apparatus further comprises means for detecting a first activation of a mapping mode user interface element, and in response to detecting the first activation of the mapping mode user interface element, entering a tracked mode of the mapping application, the tracked mode comprising: means for displaying a current location icon on the map that corresponds to a current location of the portable electronic device; means for displaying the map on the display with an orientation that is independent of a current orientation of the portable electronic device; and means for maintaining the current location icon at a substantially fixed location on the touch screen display as the current location of the portable electronic device changes. While in the tracked mode of the mapping application, the information processing apparatus further comprises means for detecting a second activation of the mapping mode user interface element, and in response to detecting the second activation of the mapping mode user interface element, means for entering a heading mode of the mapping application, the heading mode comprising: means for displaying the current location icon; means for displaying the map on the display with an orientation that corresponds to the current orientation of the portable electronic determined with the magnetometer; and means for maintaining the current location icon at the substantially fixed location on the touch screen display as the current location of the portable electronic device changes. While in the heading mode of the mapping application, the information processing apparatus further comprises means for detecting a finger scrolling gesture on the touch screen display, and in response to detecting the finger scrolling gesture on the touch screen display: means for entering the tracked mode of the mapping application when the finger scrolling gesture moves the map less than a predefined amount on the touch screen display, and means for entering the untracked mode of the mapping application when the finger scrolling gesture moves the map greater than the predefined amount on the touch screen display.

Thus, portable electronic devices with touch screen displays are provided with faster, more efficient and intuitive methods and interfaces for changing between map viewing modes, thereby increasing the effectiveness, efficiency, and user satisfaction with such devices.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 6A-6C are flow diagrams illustrating a method of changing between map viewing modes in accordance with some embodiments.

DESCRIPTION OF EMBODIMENTS

Figure 1A:
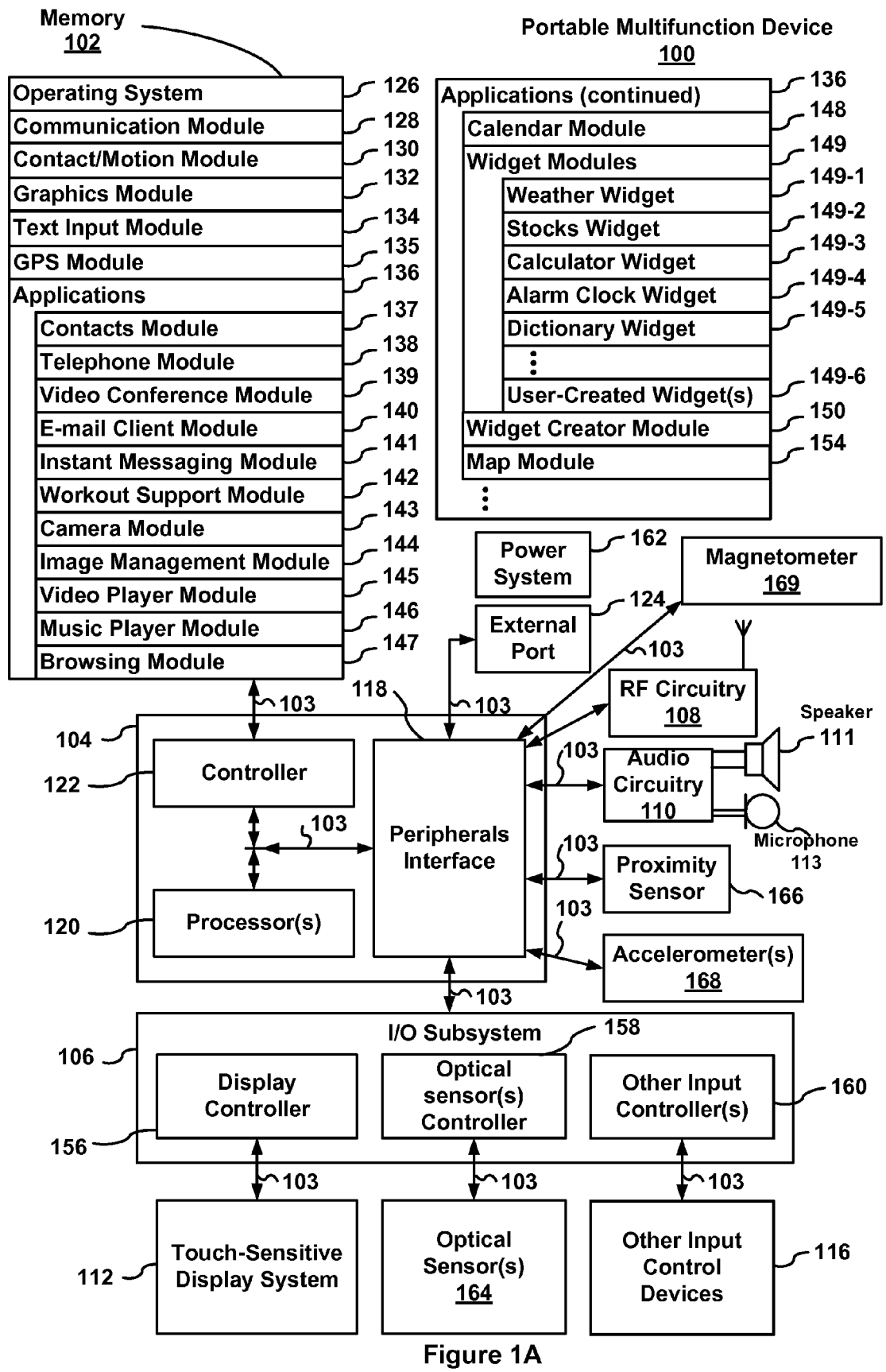
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Inc. of Cupertino, Calif.

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications in addition to the mapping application, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
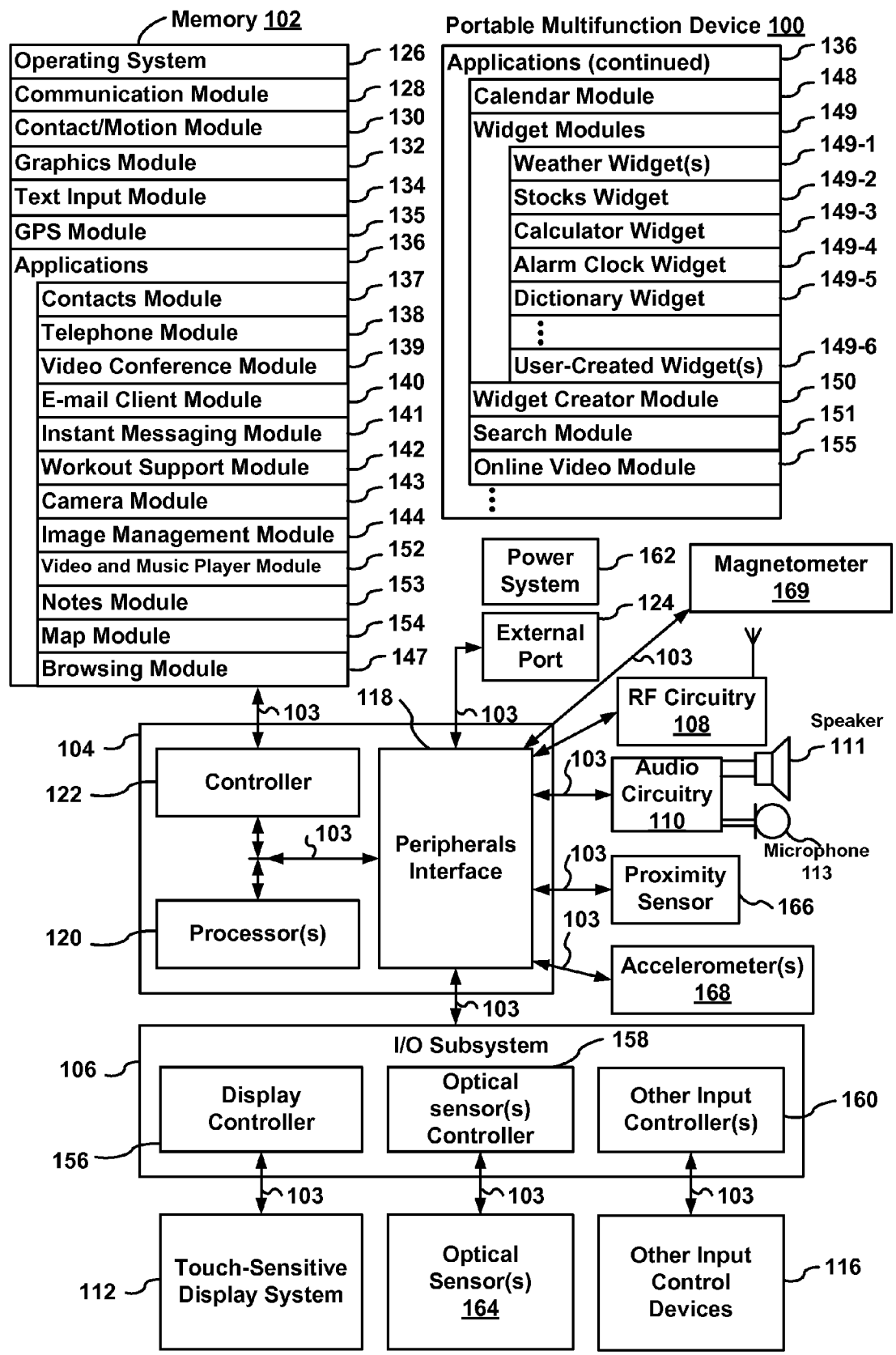

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include memory 102, a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122. Memory 102, or the non-volatile memory of memory 102, includes one or more computer readable storage mediums.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of the touch screen 112 may be analogous to the multi-touch sensitive tablets described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector In Handheld Device"; 11/240,788, "Proximity Detector In Handheld Device"; 11/620,702, "Using Ambient Light Sensor To Augment Proximity Sensor Output"; 11/586,862, "Automated Response To And Sensing Of User Activity In Portable Devices"; and 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

The device 100 may also include a magnetometer 169. FIGS. 1A and 1B show a magnetometer 169 coupled to the peripherals interface 118. Alternately, the magnetometer 169 may be coupled to an input controller 160 in the I/O subsystem 106. The magnetometer is used to determine the orientation of the device.

In some embodiments, the software components stored in memory 102 (e.g., in a computer readable storage medium of memory 102) may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture comprises detecting a finger-down event followed by detecting a finger-up event at the same position (or substantially the same position) as the finger-down event (e.g., at the position of an icon). As another example, detecting a finger swipe gesture on the touch-sensitive surface comprises detecting a finger-down event followed by detecting one or more finger-dragging events, and subsequently followed by detecting a finger-up event.

In some embodiments, the contact/motion module 130 (FIG. 1B) detects finger swipe gestures, and implements scrolling of information on the display (112, FIG. 2) of the device when one or more finger swipe gestures made with a user's finger meet predefined criteria.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:

- a contacts module 137 (sometimes called an address book or contact list);
- a telephone module 138;
- a video conferencing module 139;
- an e-mail client module 140;
- an instant messaging (IM) module 141;
- a workout support module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contacts list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, magnetometer 169, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
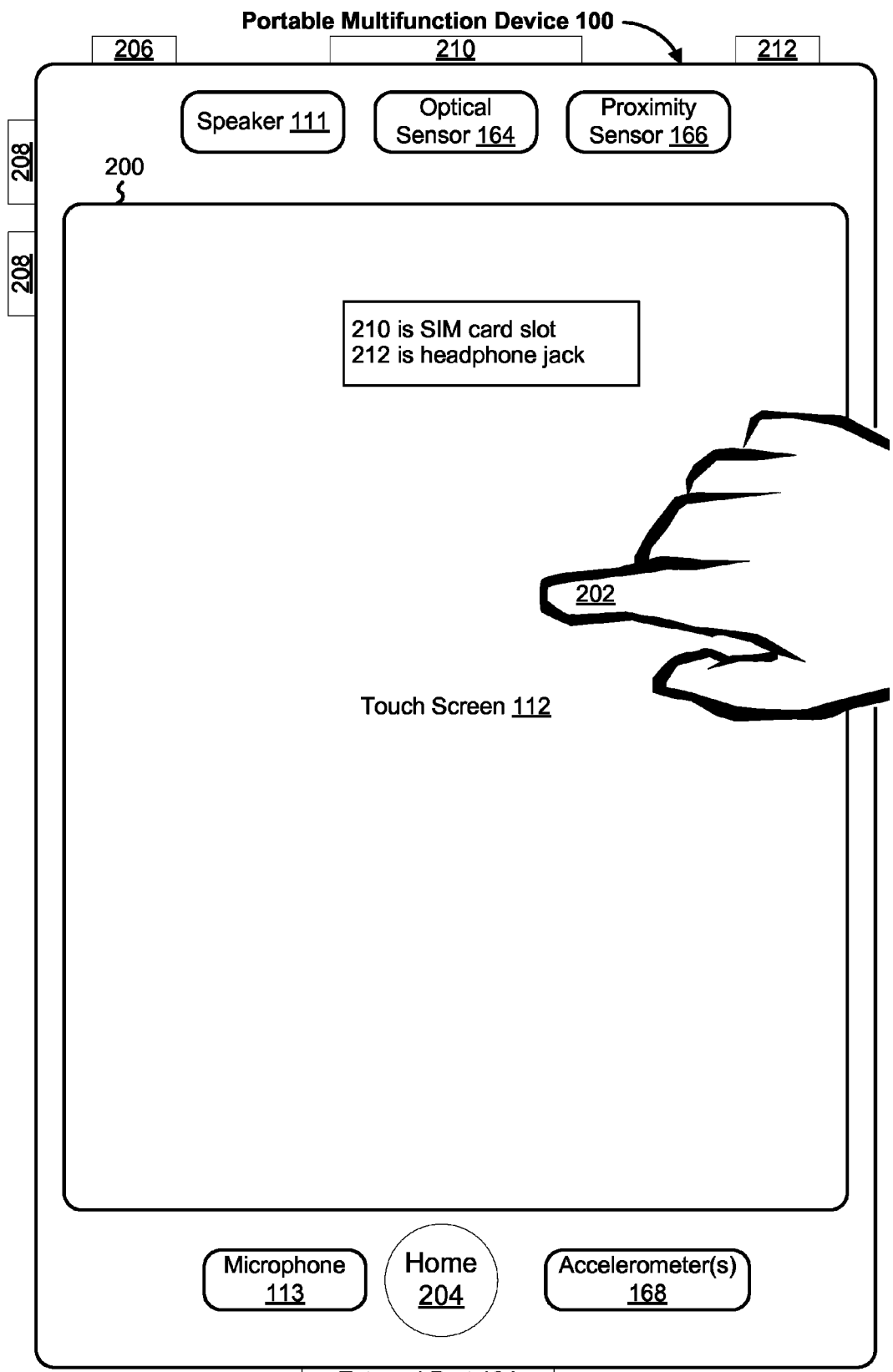
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") that may be implemented on a portable multifunction device 100.

Figure 3:
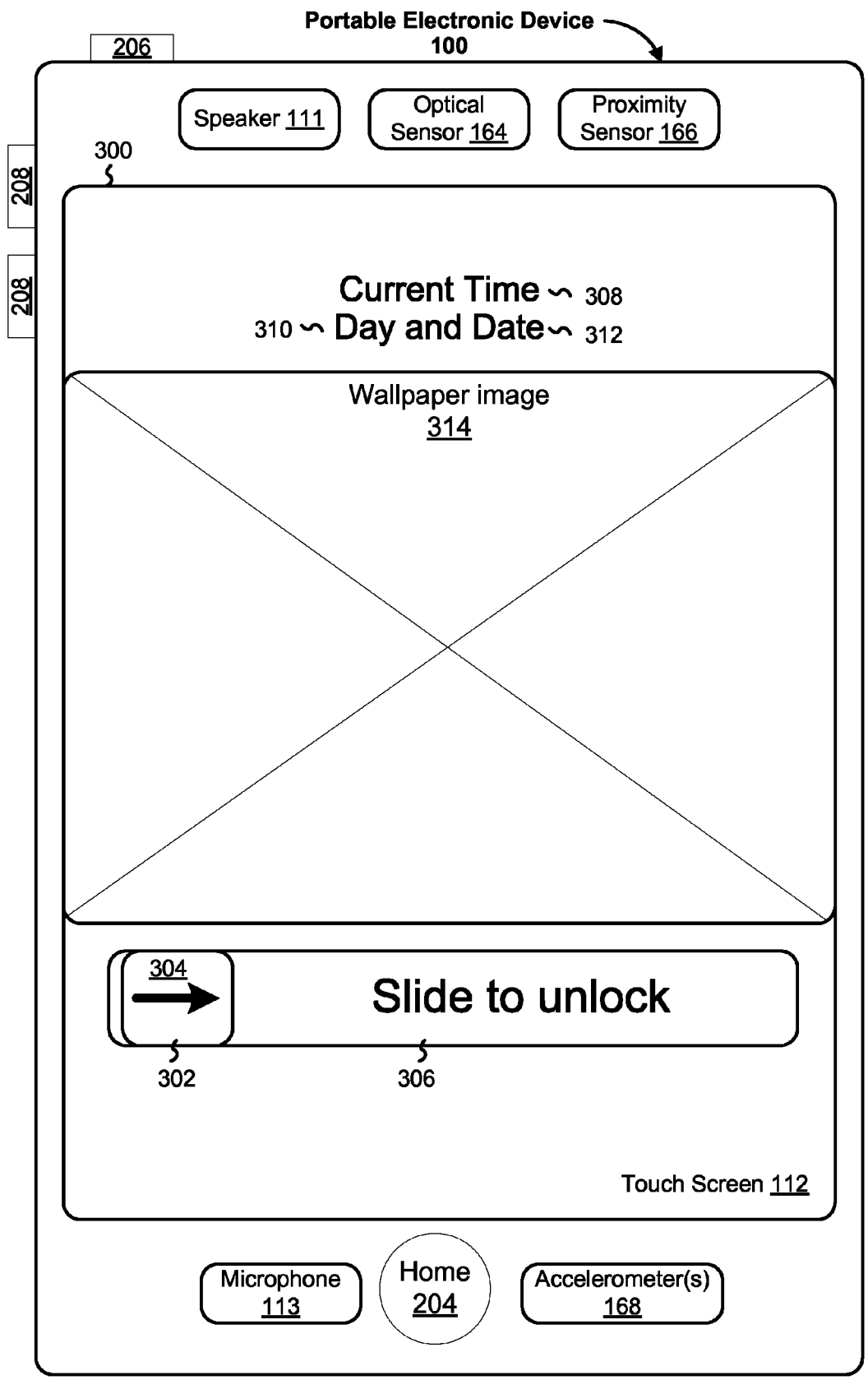
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. Nos. 11/322,549, "Unlocking A Device By Performing Gestures On An Unlock Image," filed Dec. 23, 2005, and 11/322,550, "Indication Of Progress Towards Satisfaction Of A User Input Condition," filed Dec. 23, 2005, which are hereby incorporated by reference in their entirety.

Figure 4A:
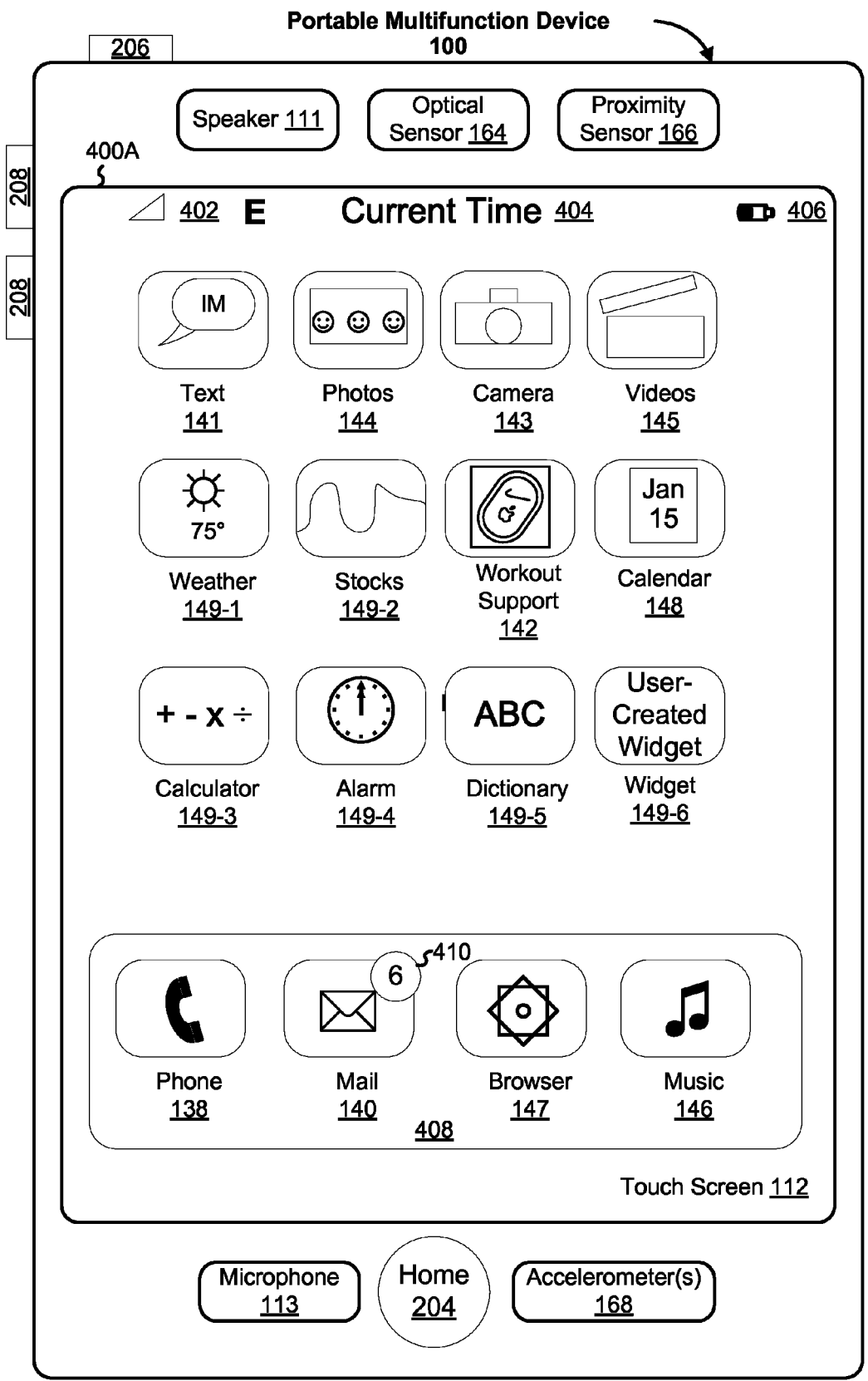
FIGS. 4A and 4B illustrate exemplary user interfaces for a menu of applications on a portable multifunction device in accordance with some embodiments.
Figure 4B:
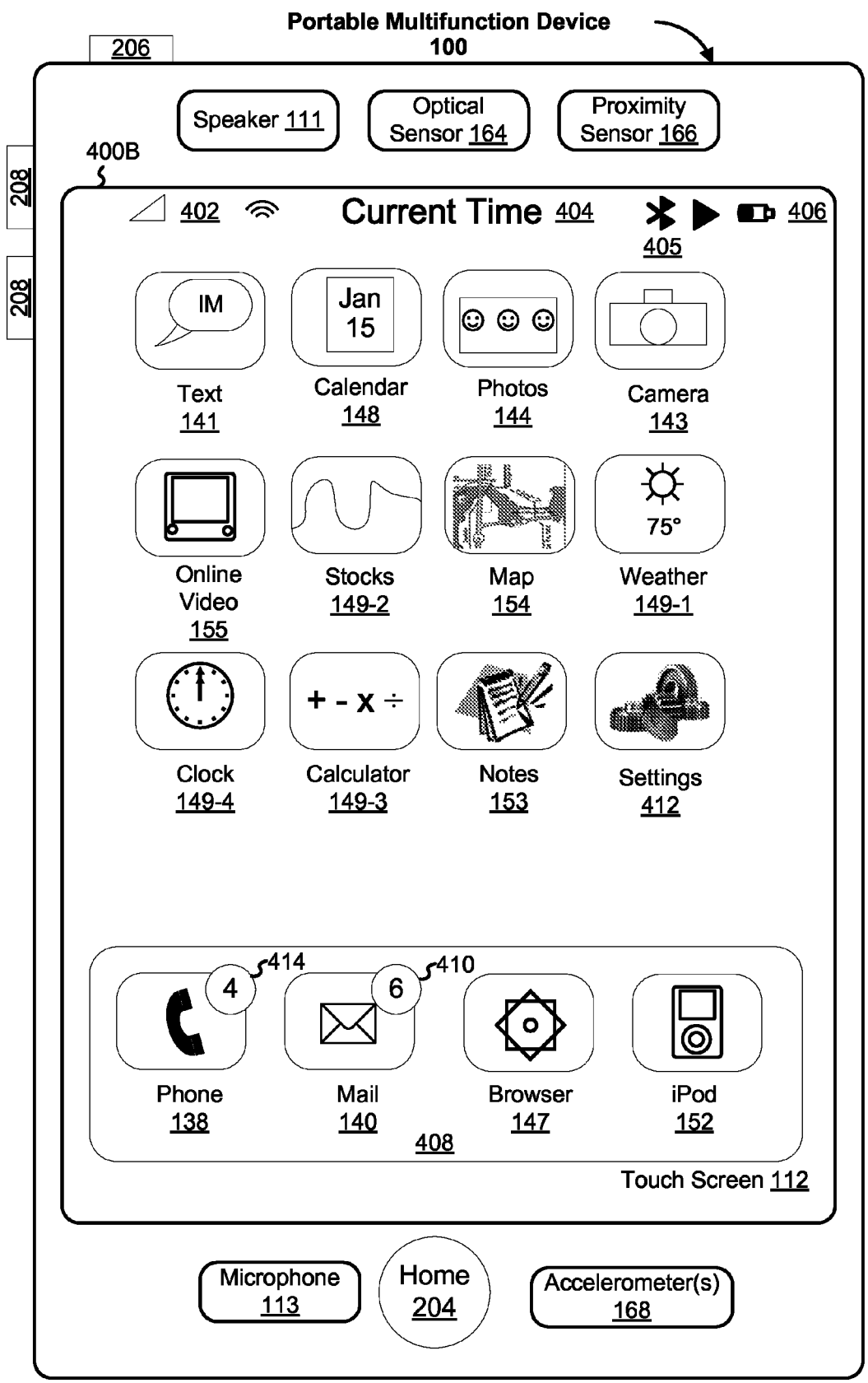

FIGS. 4A and 4B illustrate exemplary user interfaces for a menu of applications on a portable multifunction device 100 in accordance with some embodiments. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
    Phone 138, which may include an indicator 414 of the number of missed calls or voicemail messages;

E-mail client 140, which may include an indicator 410 of the number of unread e-mails;

Browser 147; and

Music player 146; and

Icons for other applications, such as:

IM 141;

Image management 144;

Camera 143;

Video player 145;

Weather 149-1;

Stocks 149-2;

Workout support 142;

Calendar 148;

Calculator 149-3;

Alarm clock 149-4;

Dictionary 149-5; and

User-created widget 149-6.

In some embodiments, user interface 400B includes the following elements, or a subset or superset thereof:

402, 404, 405, 406, 141, 148, 144, 143, 149-3, 149-2, 149-1, 149-4, 410, 414, 138, 140, and 147, as described above;

Map 154;

Notes 153;

Settings 412, which provides access to settings for the device 100 and its various applications 136, as described further below;

Video and music player module 152, also referred to as iPod (trademark of Apple Inc.) module 152; and Online video module 155, also referred to as YouTube (trademark of Google Inc.) module 155.

Attention is now directed towards embodiments of user interfaces ("UI") and associated processes that may be implemented on an electronic device with a display and a touch-sensitive surface, such as portable multifunction device 100.

Figure 5A:
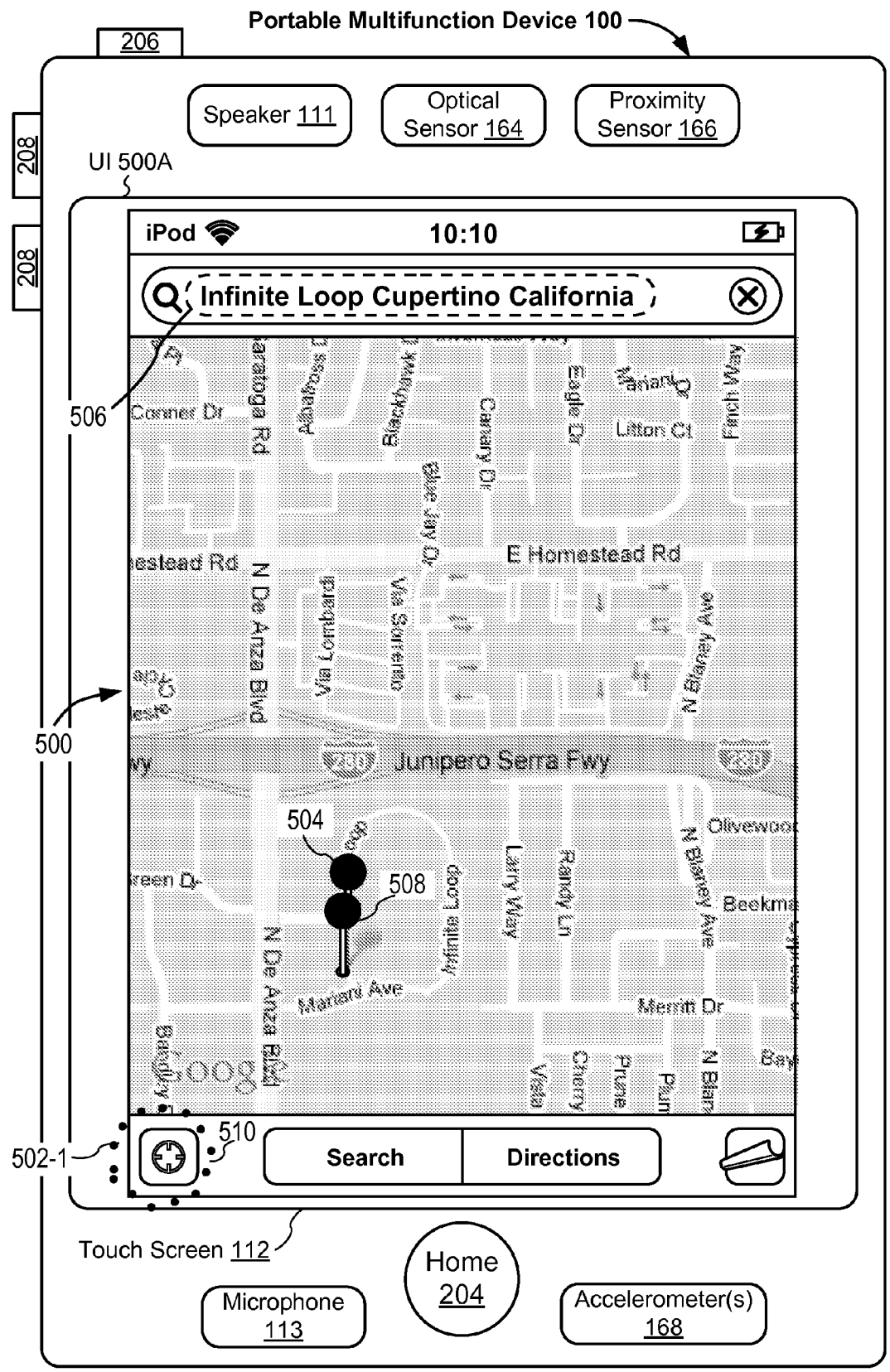
FIGS. 5A-5T illustrate exemplary user interfaces in a mapping application in accordance with some embodiments.
Figure 5B:
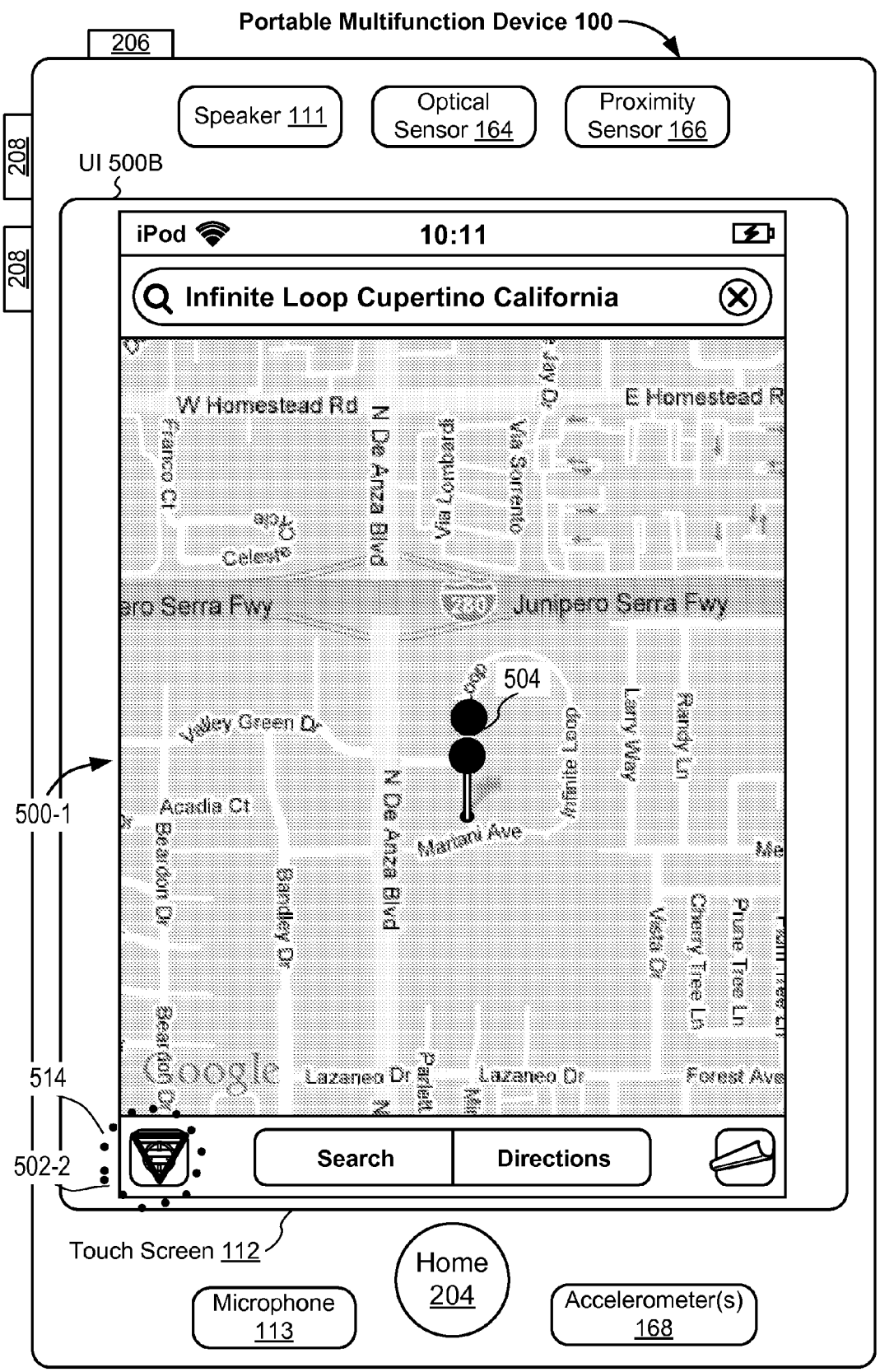
Figure 5C:
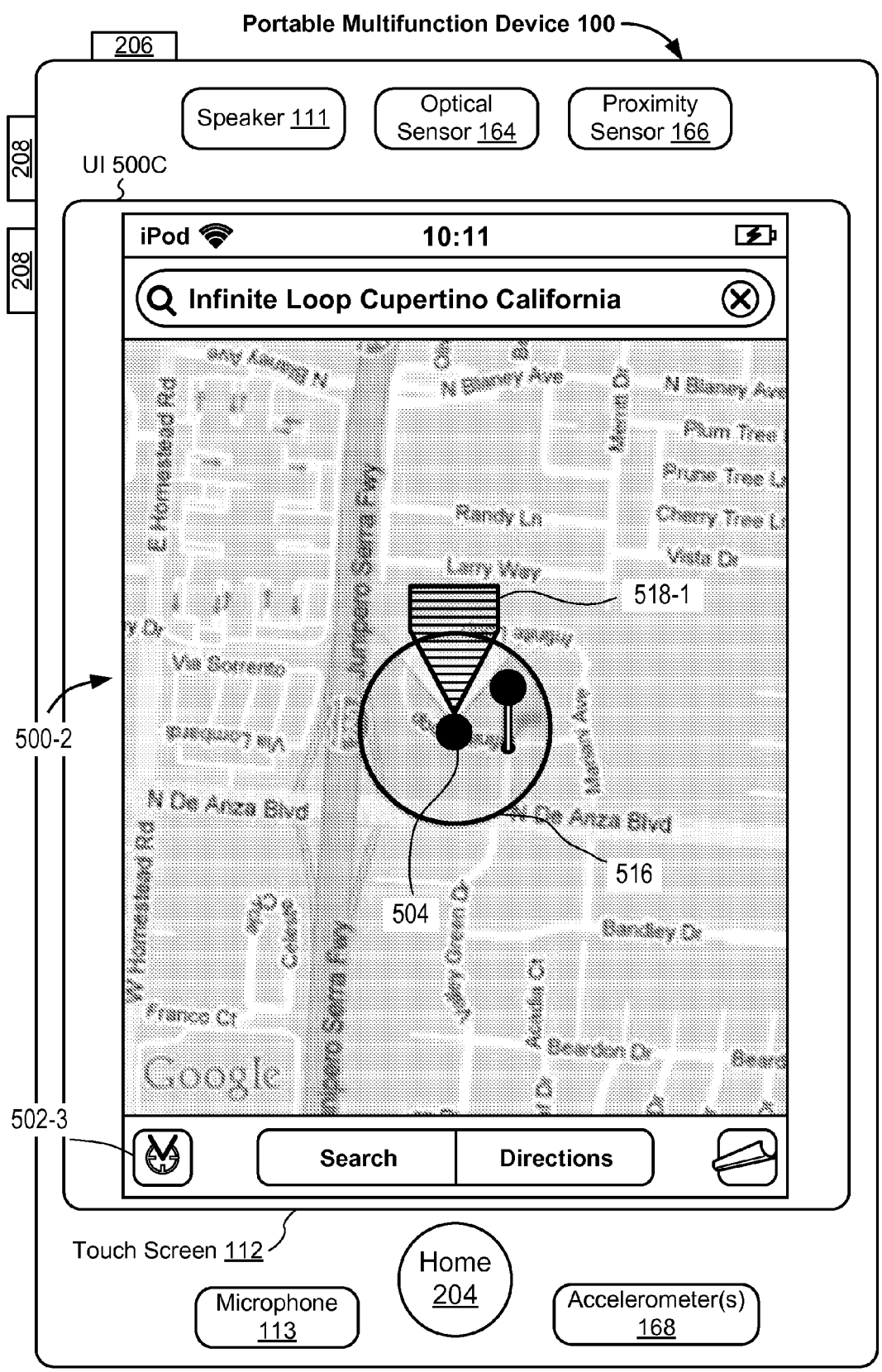
Figure 5D:
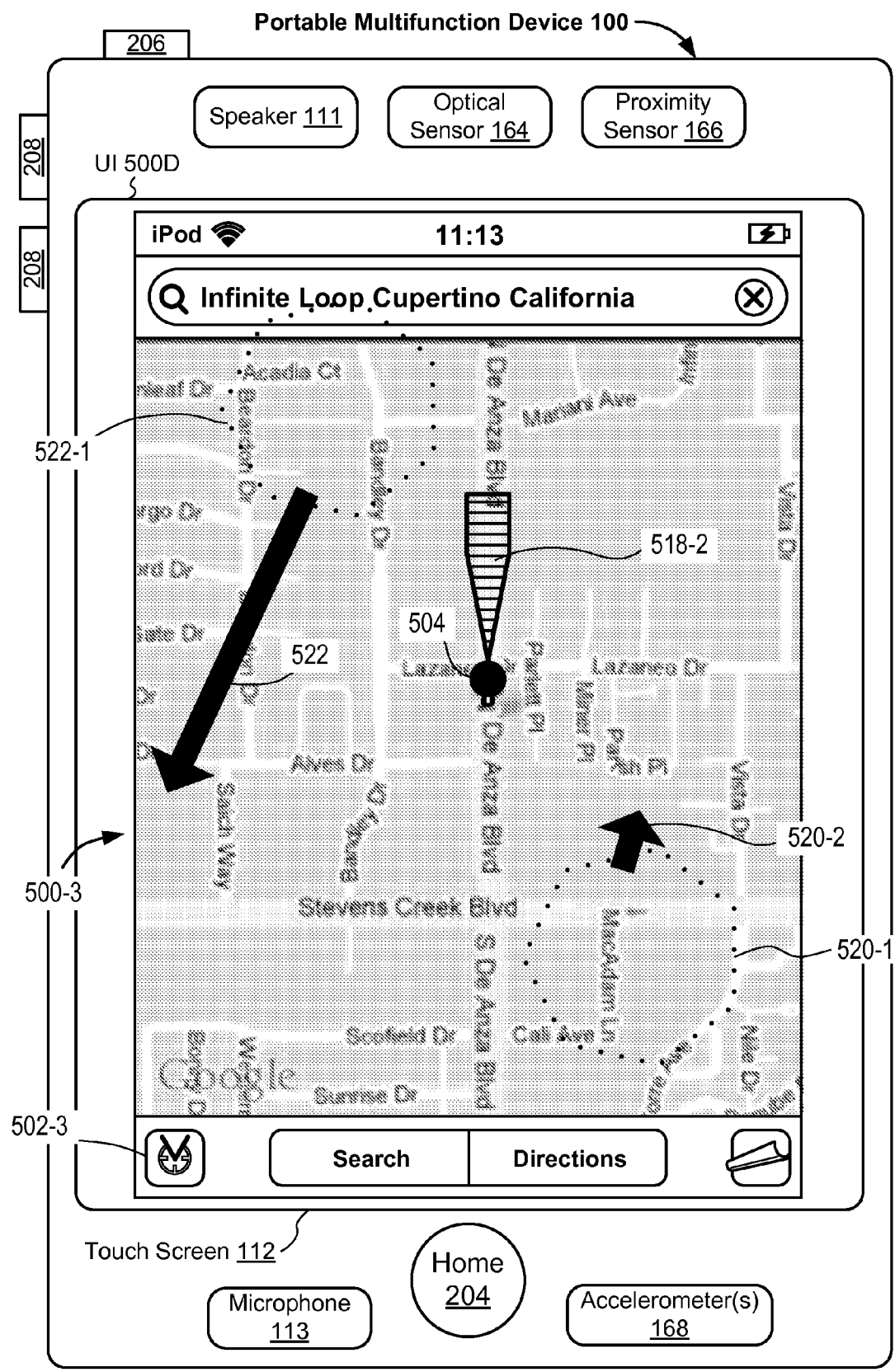
Figure 5E:
Figure 5F:
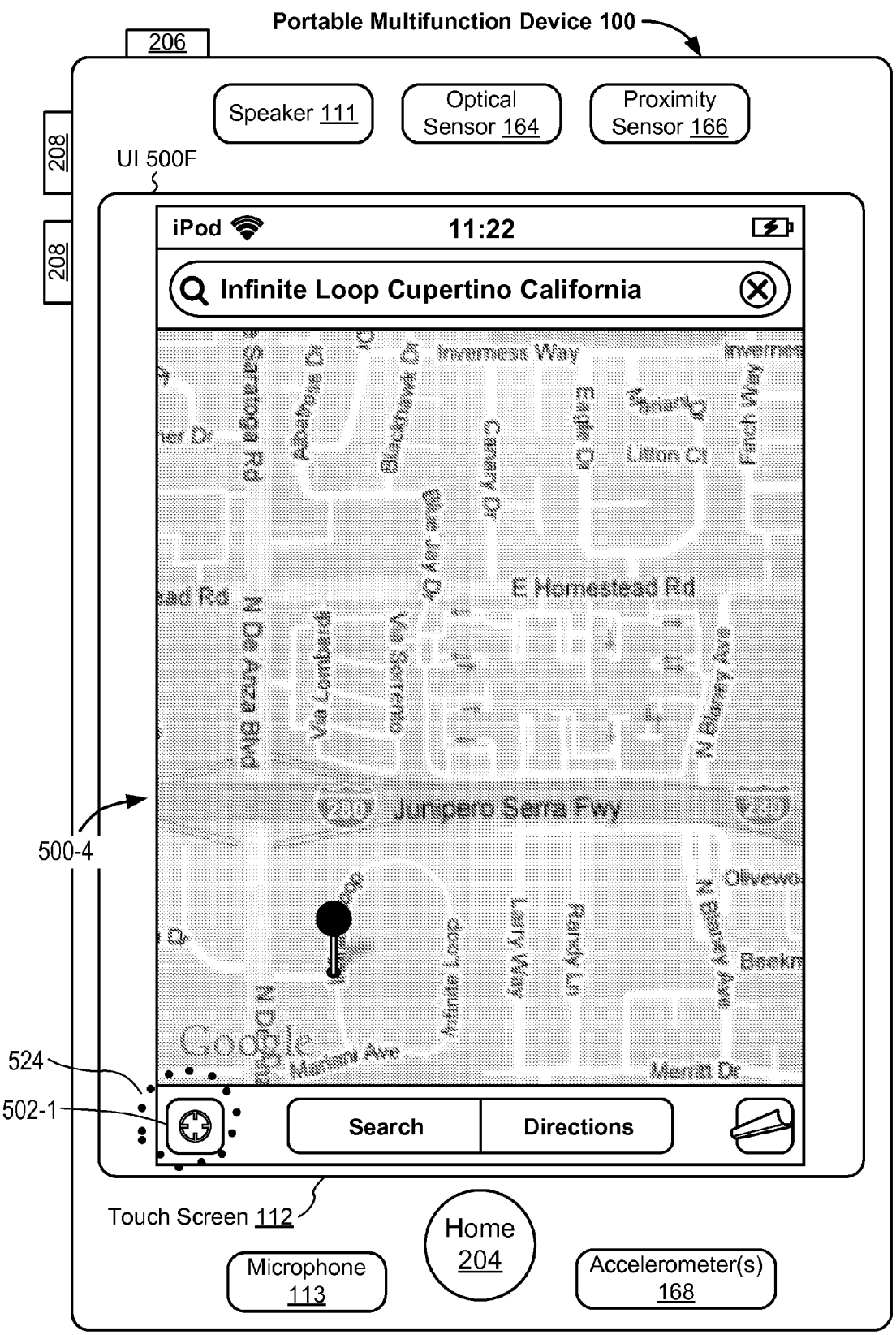
Figure 5G:
Figure 5H:
Figure 5I:
Figure 5J:
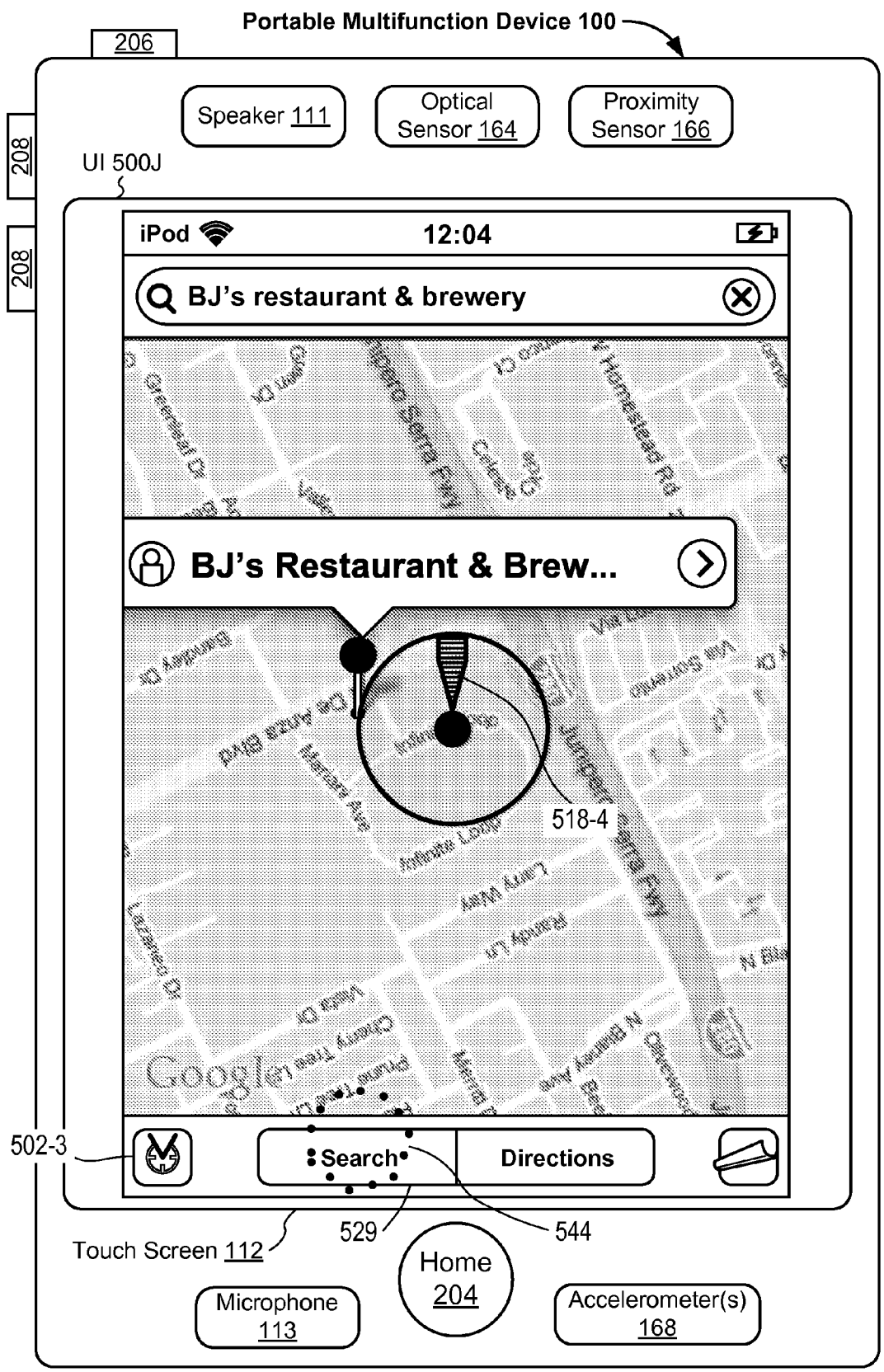
Figure 5K:
Figure 5L:
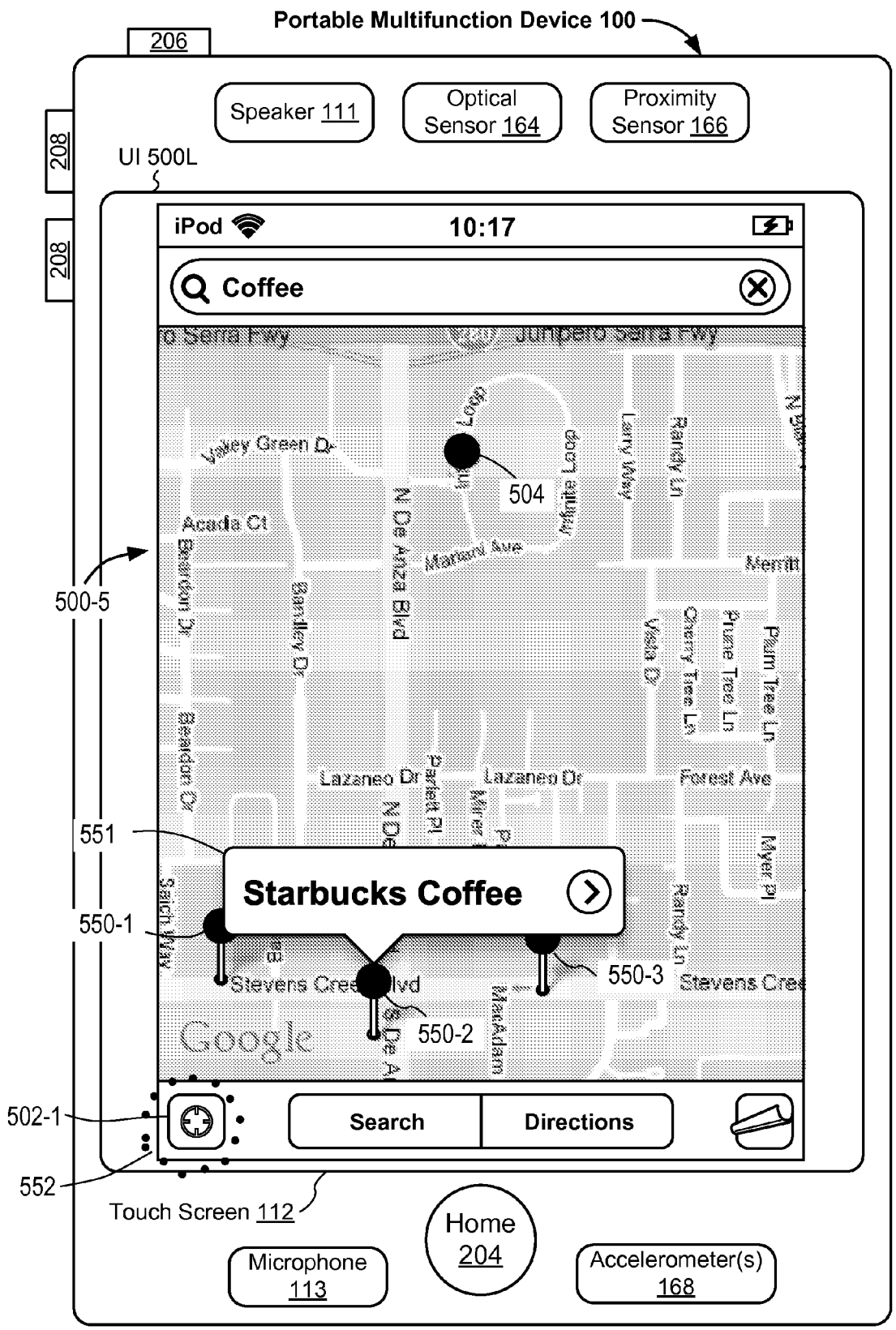
Figure 5M:
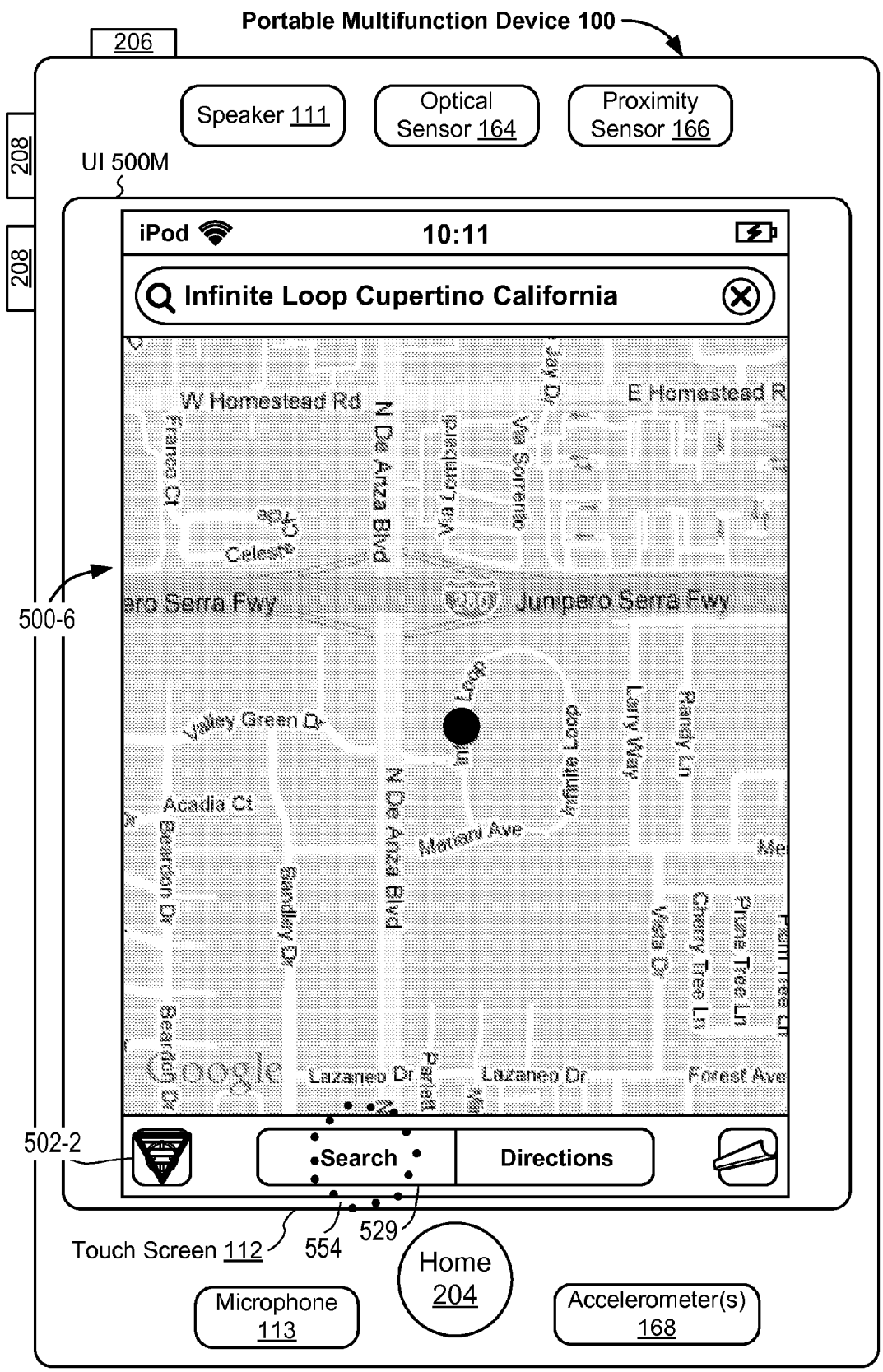
Figure 5N:
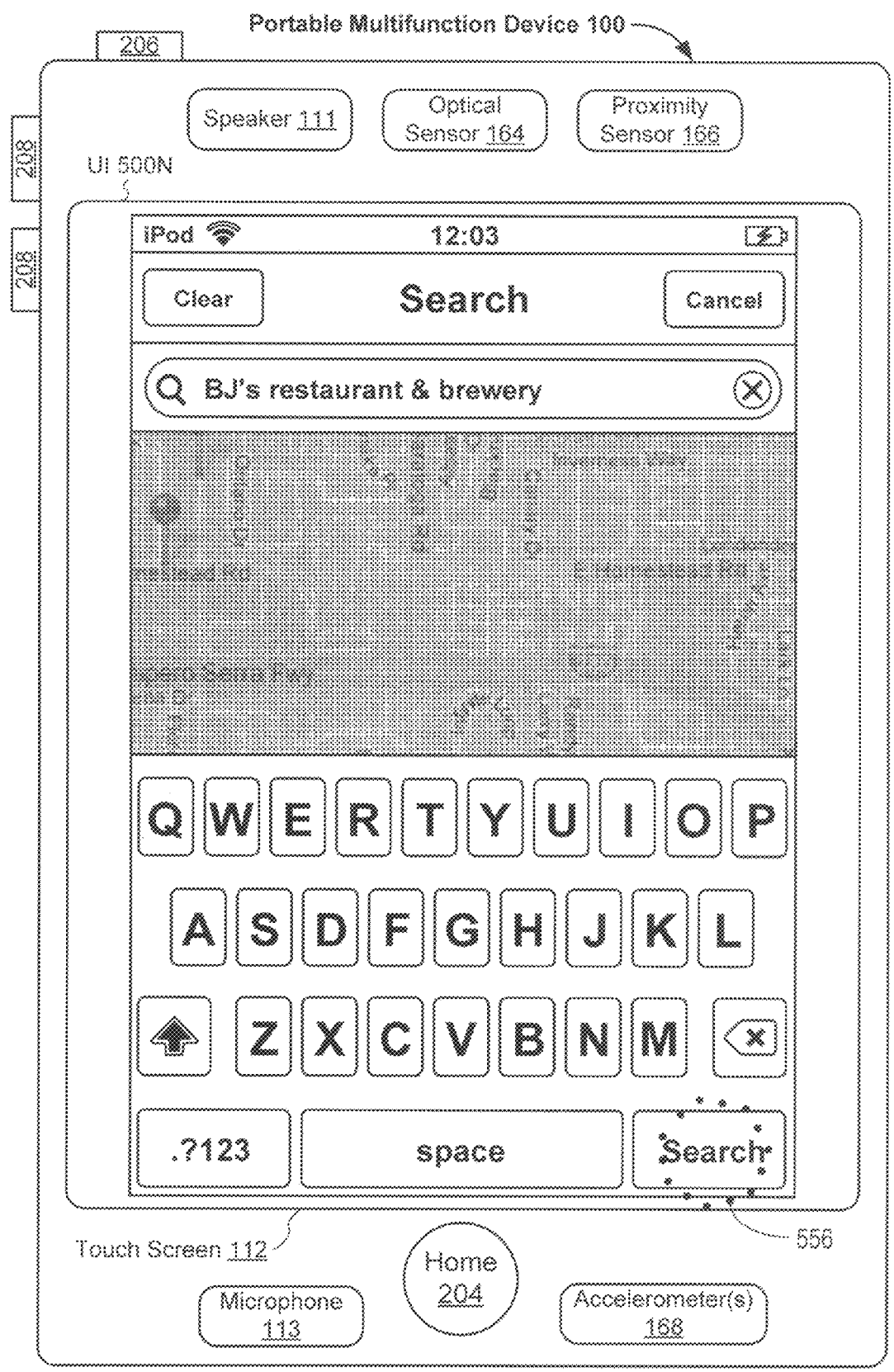
Figure 5O:
Figure 5P:
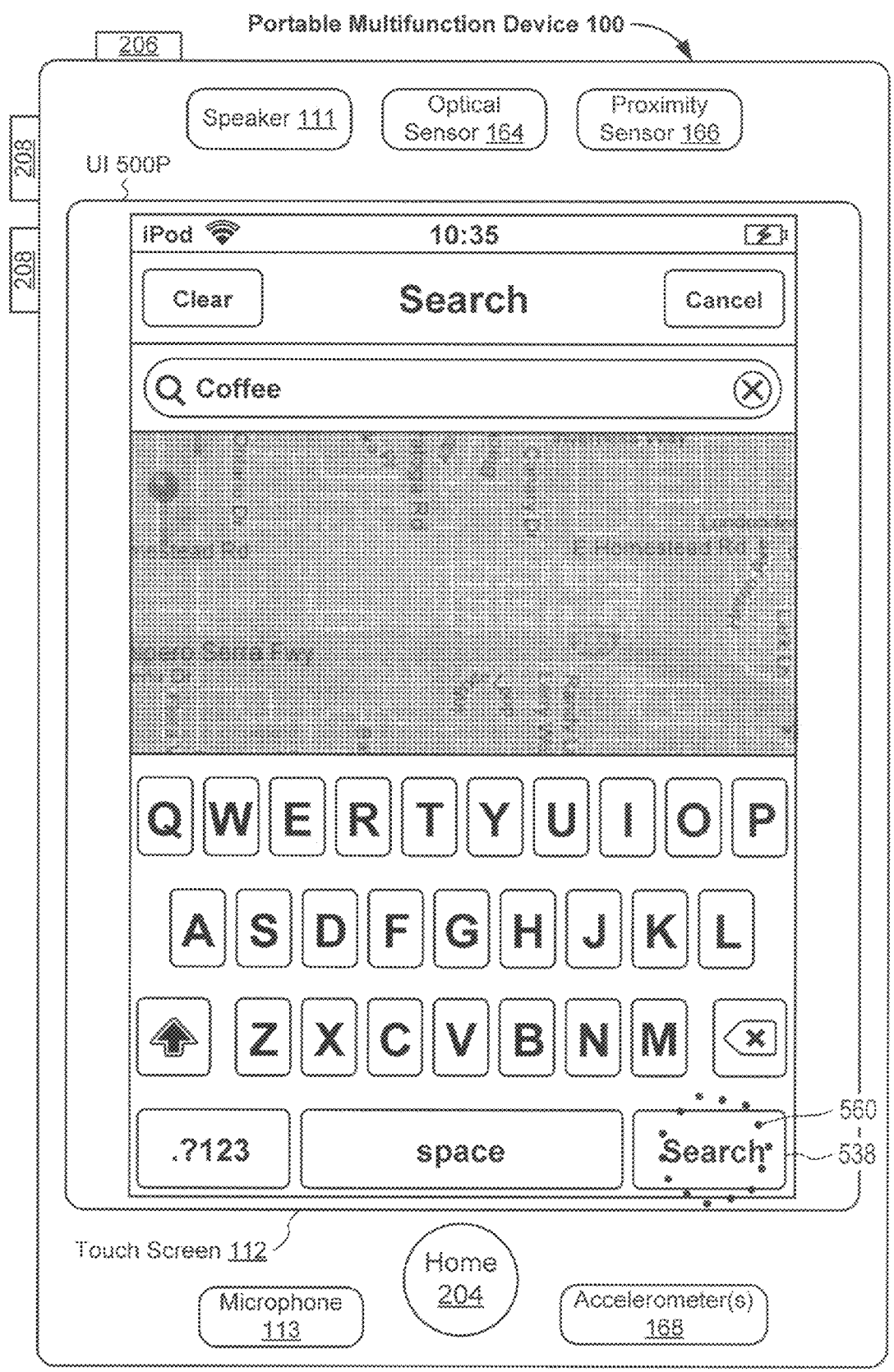
Figure 5Q:
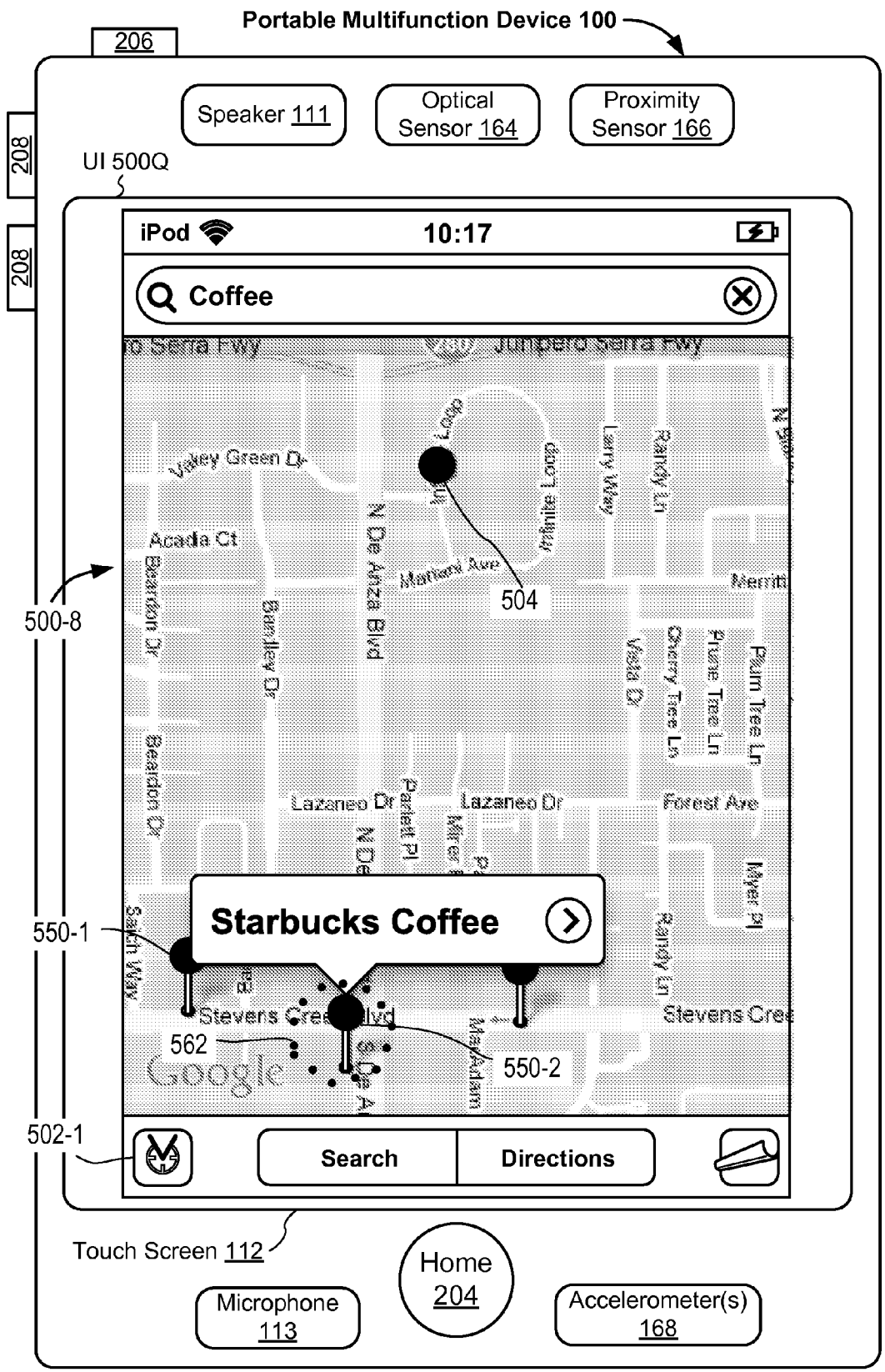
Figure 5R:
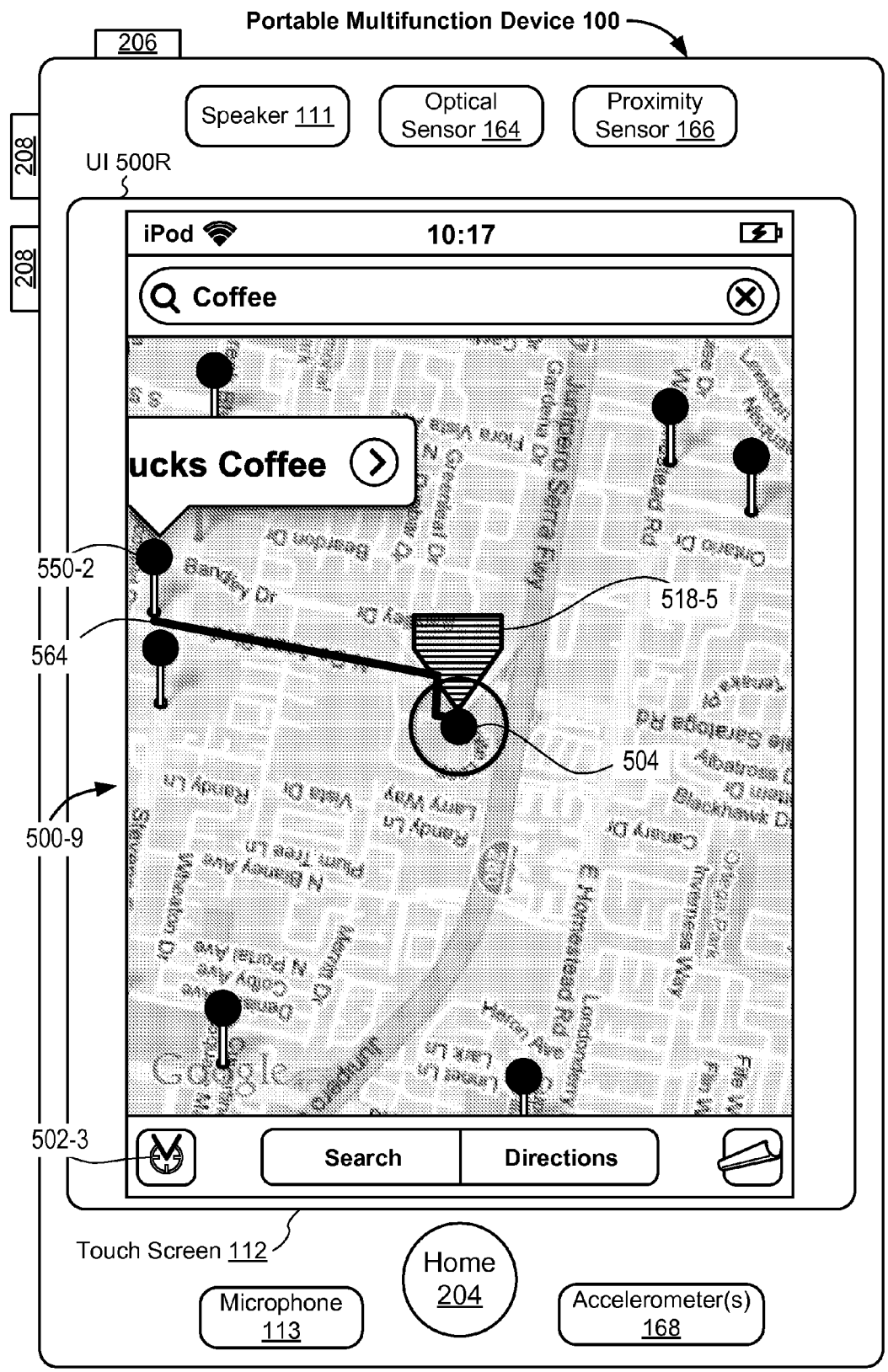
Figure 5S:
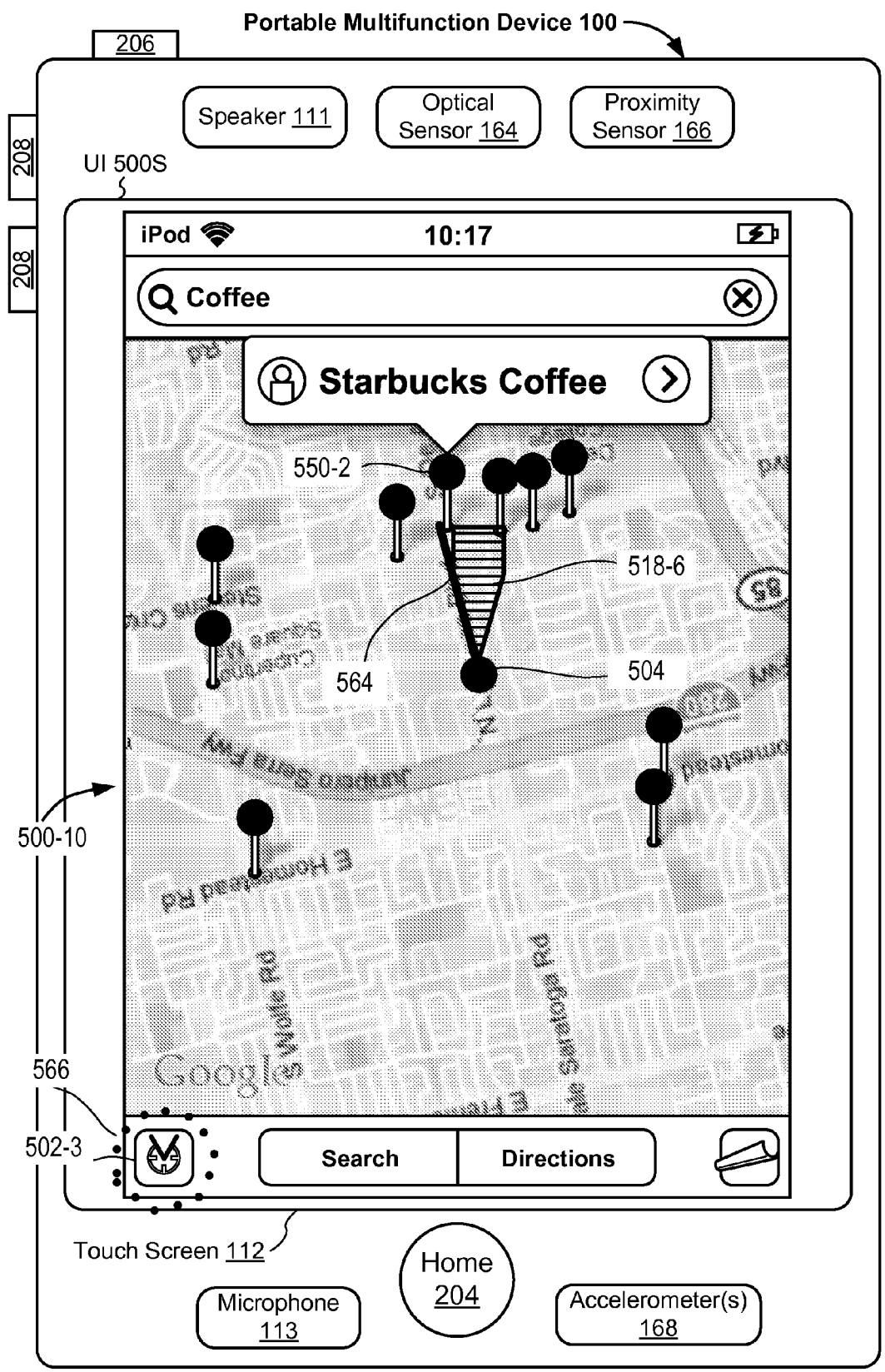
Figure 5T:
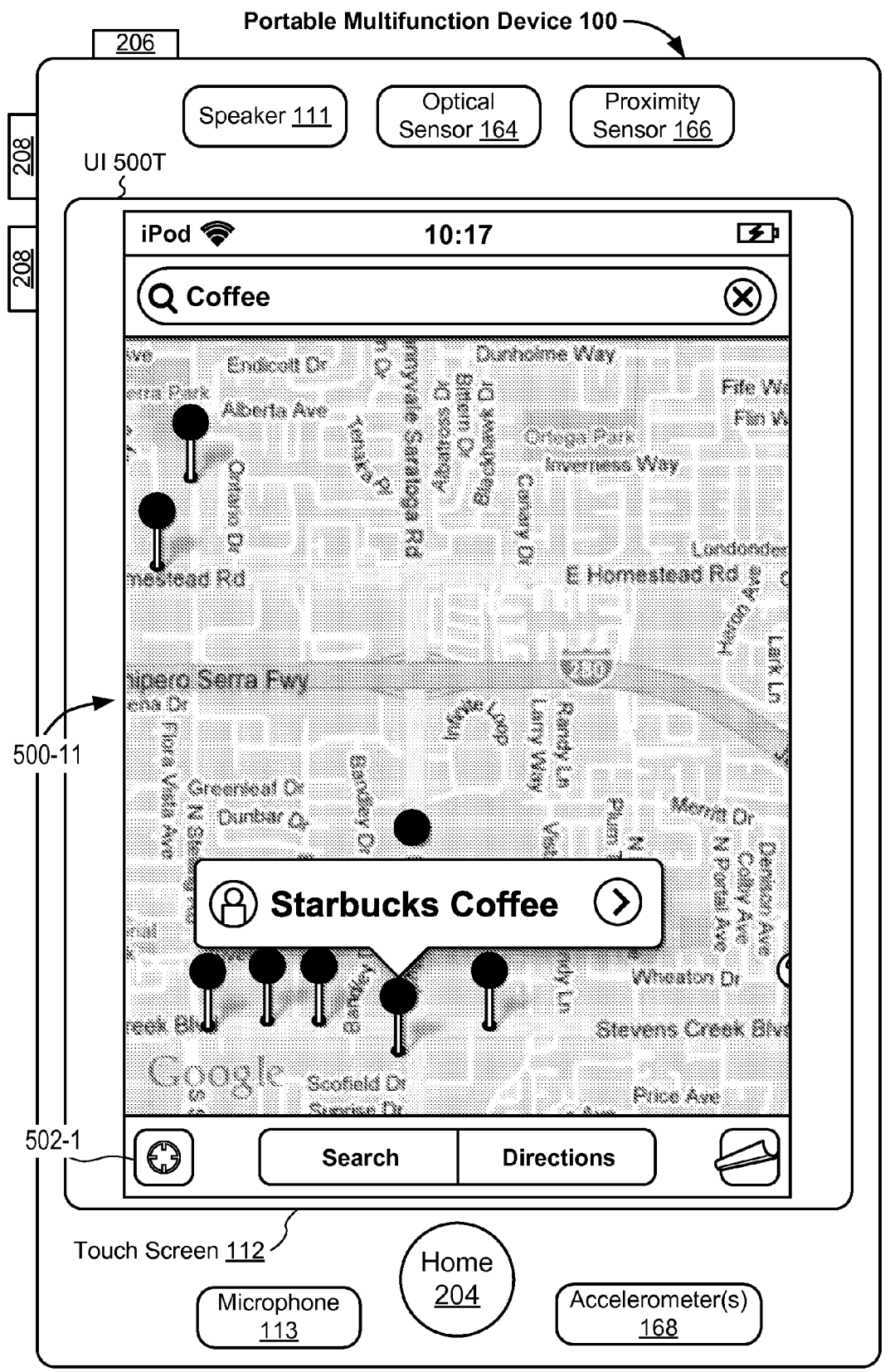

FIGS. 5A-5T illustrate exemplary user interfaces in a mapping application in accordance with some embodiments. The user interfaces in these figures are used to illustrate the processes described below with respect to FIGS. 6A-6C.

UI 500A (FIG. 5A) illustrates a user interface on a portable electronic device, here portable multifunction device 100 with touch screen 112. A map 500 is displayed on the touch screen 112 of the device 100 by a mapping application 154. A mapping mode user interface element 502 is displayed in a first appearance, here 502-1, which indicates the mapping application is in an untracked mode. The untracked mode displays the map on the display 112 with an orientation that is independent of a current orientation of the portable electronic device. Here, as depicted in UI 500A, the map 500 is in the untracked mode and current location icon 504 is not maintained at a substantially fixed location on the touch screen 112.

UI 500A also depicts that a search has taken place for search terms 506 (i.e. "Infinite Loop Cupertino California"), and a search result icon 508 is depicted at the location on the map corresponding to the search result.

UI 500A also depicts a user gesture 510 (e.g., a finger tap), at the location of the mapping mode user interface element 502.

UI 500B (FIG. 5B) illustrates that in response to detecting user gesture 510, the mapping application has entered a tracked mode. The tracked mode includes: displaying a current location icon 504 on the map 500 that corresponds to a current location of the electronic device 100; displaying the map on the touch screen 112 with an orientation that is independent of a current orientation of the electronic device 100; and maintaining the current location icon 504 at a substantially fixed location on the touch screen 112 as the current location of the electronic device 100 changes. Here, UI 500B depicts that the mapping application has moved the current location icon 504 to a substantially central location on the touch screen 112. Further the mapping mode user interface element 502 has been altered to be displayed in a second appearance 502-2, indicating that the mapping application is in the tracked mode.

UI 500B also depicts a user gesture 514 at the location of the mapping mode user interface element 502.

Finally, note that UI 500B depicts that map 500 is in a first location 500-1 with a given orientation (e.g., the map depicts U.S. Highway 280 in a left-to-right orientation) that is independent of a current orientation of the electronic device 100.

UI 500C (FIG. 5C) illustrates that in response to detecting user gesture 514, the mapping application has entered a heading mode. The heading mode displays the current location icon 504. The heading mode also displays the map 500 on the display with an orientation that corresponds to the current orientation of the portable electronic device determined with the magnetometer. Here, map 500 is in a second location 500-2 with a different orientation than that depicted in UI 500B, (i.e., the map in UI 500C is depicted with U.S. Highway 280 in a roughly bottom-to-top orientation based on the orientation of the electronic device 100). The heading mode also maintains the current location icon 504 at a substantially fixed location on the touch screen 112 as the current location of the electronic device 100 changes (e.g., a substantially central location on the touch screen 112). In some embodiments, the heading mode also displays a current location region indicia 516 that depicts the approximate area within which the electronic device 100 is physically located.

UI 500C also depicts the mapping mode user interface element 502 has been altered to be displayed in a third appearance 502-3, indicating that the mapping application is in the heading mode.

UI 500C also depicts that, in some embodiments, while in the heading mode, the current location icon 504 is displayed with a heading indicator 518-1 which may include an arc that corresponds to the orientation of the device.

UI 500D (FIG. 5D) depicts a different location 500-3 on the map 500, which is displayed in heading mode as indicated by mapping mode user interface element 502-3 and heading indicator 518-2. Note that heading indicator 518-2 is narrower than heading indicator 518-1 (FIG. 5C). In some embodiments, the heading indicator 518 may be an arc that has an angular range that varies in accordance with an uncertainty in the orientation of the device, and the angular range of the arc may be updated as the mapping application detects changing uncertainty in the orientation of the electronic device 100.

UI 500D also depicts that a user gesture 520 is detected on the touch screen 112, a small finger scrolling gesture that includes a finger contact 520-1 followed by a small movement 520-2 on the touch screen 112.

UI 500E (FIG. 5E) illustrates that in response to detecting the small finger scrolling gesture 520, the mapping application entered the tracked mode, as indicated by the appearance of mapping mode user interface element 502-2 and the change in the orientation of the map to an orientation that is independent of the current orientation of the portable electronic device. Note that in some embodiments, as depicted here, entering the tracked mode may also return the current location icon 504, which may have moved in response to a user gesture such as user gesture 520, to the substantially fixed location on the touch screen 112. This return of the current location icon may result from a user gesture moving the map less than a predefined amount on the touch screen 112.

UI 500D also depicts that a larger finger scrolling gesture 522 is detected on the touch screen 112, which includes a finger contact 522-1 followed by a larger movement 522-2 on the touch screen 112 than the movement 520-2.

UI 500F (FIG. 5F) illustrates that in response to detecting the larger finger scrolling gesture 522, the mapping application enters the untracked mode, as indicated by mapping mode user interface element 502-1, and the repositioned and reoriented map 500-4.

UI 500F also illustrates two user gestures 524 (e.g., two single-tap gestures) at the location of the mapping mode user interface element 502.

UI 500G (FIG. 5G) illustrates that in response to detecting two user gestures 524, the mapping application entered the heading mode as indicated by mapping mode user interface element 502-3 and heading indicator 518-3, and reoriented the map 500 and current location icon 504 to account for the current orientation of the electronic device 100.

UI 500G also illustrates a user gesture 528 on search icon 529, indicating the user wants to do a search in the mapping application.

UI 500H (FIG. 5H) illustrates that in response to user gesture 528, the mapping application initiated a search input UI. A user entered a search into search box 532, namely, a search term 534 (i.e., "BJ's restaurant & brewery"). UI 500H also illustrates a user gesture 536 on search icon 538, which initiates a search with the entered search term 534.

UI 500I (FIG. 5I) illustrates that in response to user gesture 536, the mapping application displays a search result 540 for "BJ's Restaurant & Brewery." The mapping application has also entered the tracked mode, as indicated by mapping mode user interface element 502-2 and the change in orientation of the map. UI 500I also illustrates a user gesture 542 on mapping mode user interface element 502.

UI 500J (FIG. 5J) illustrates that in response to user gesture 542, the mapping application has entered the heading mode as indicated by mapping mode user interface element 502-3, the change in map orientation, and, in this example, by heading indicator 518-4.

UI 500J also illustrates a user gesture 544 on search icon 529, indicating the user wants to do another search in the mapping application.

UI 500K (FIG. 5K) depicts that in response to user gesture 544, the mapping application initiated a search input UI. A user entered a search into search box 532, namely, a search term 546 (i.e., "Coffee"). UI 500K also illustrates a user gesture 548 on search icon 538, which initiates a search with the entered search term 546.

UI 500L (FIG. 5L) illustrates that in response to user gesture 548, the mapping application has displayed search results 550-1, 550-2, and 550-3 for "Coffee," and one result is highlighted with an information tag 551. The mapping application has also entered the untracked mode, as indicated by mapping mode user interface element 502-1, because in this example, the displayed search results moved the map greater than a predefined amount on the touch screen display (discussed more below). In essence, because the search results were far enough away from current location icon 504, the mapping application exited tracked mode and redisplayed the map in a new location 500-5 that permitted display of the search results.

UI 500L also illustrates a user gesture 552 on mapping mode user interface element 502.

UI 500M (FIG. 5M) illustrates that in response to detecting user gesture 552, the mapping application entered the tracked mode as indicated by mapping mode user interface element 502-2, and repositioned the map 500 to location 500-6, with the current location icon 504 centered on the map.

UI 500M also illustrates a user gesture 554 on search icon 529, indicating the user wants to do yet another search in the mapping application.

UI 500N (FIG. 5N) illustrates that in response to user gesture 554, the mapping application initiated a search input UI. A user entered the same search as depicted in UI 500H, and initiated the search with user gesture 556.

UI 500O (FIG. 5O) illustrates that in response to user gesture 556, the mapping application remains in the tracked mode, as indicated by mapping mode user interface element 502-2. The mapping application remains in the tracked mode because the search result was less than a predefined distance away from the current location icon 504. The map 500 is repositioned to location 500-7, with the current location icon 504 centered on the map.

UI 500O also depicts user gesture 558 on search icon 529, indicating the user wants to do another search in the mapping application.

UI 500P (FIG. 5P) depicts that in response to user gesture 558, the mapping application initiated a search input UI, like that depicted in UI 500K, and a user gesture 560 on search icon 538 invokes the search.

UI 500Q (FIG. 5Q) depicts that in response to user gesture 560, although the mapping application was in tracked mode at the time of the search, the mapping application enters the untracked mode as indicated by mapping mode user interface element 502-1, and repositions the map 500 to location 500-8. In essence, because the search results were far enough away from current location icon 504, the mapping application exited tracked mode and redisplayed the map in a new location 500-8 that permitted display of the search results.

UI 500Q also depicts user gesture 562 at search location 550-2, which selects search result 550-2.

UI 500R (FIG. 5R) depicts that the mapping application has entered heading mode after selecting search result 550-2, as indicated by mapping mode user interface element 502-3 and heading indicator 518-5. In this example, the mapping application is displaying the map at location 500-9. In some embodiments, a route between current location icon 504 and a selected search result may be depicted (e.g., the route line 564 between current location icon 504 and selected search result 550-2).

UI 500S (FIG. 5S) depicts that as the electronic device 100 changes location when the mapping application is in heading mode, the mapping application may update current location icon 504, heading indicator 518-6, and map orientation (compare current location icon 504 in UI 500R versus current location icon 504 in UI 500S, which is further along route 564, and thus, the mapping application is displaying the map at a location 500-10, as well as updating the angular range of heading indicator 518-5 versus 518-6). Thus, in some embodiments, as the electronic device changes in location and orientation, the angular range of the heading indicator may be updated. Further, in some embodiments, as the electronic device changes in location and orientation with respect to a route to a selected search result, the angular range of the heading indicator may be updated.

UI 500S also depicts user gesture 566 at mapping mode user interface element 502-3.

UI 500T (FIG. 5T) illustrates that in response to user gesture 566, the mapping application has entered the untracked mode, as indicated by mapping mode user interface element 502-1, as well as the map being reoriented to be displayed at location 500-11.

In some embodiments, mapping mode user interface element 502 may be used to toggle through each of the modes, i.e., starting from untracked mode, one activation of mapping mode user interface element 502 causes the mapping application to enter tracked mode, a second activation of mapping mode user interface element 502 causes the mapping application to enter the heading mode, and a third activation of mapping mode user interface element 502 causes the mapping application to enter untracked mode again.

Figure 6B:
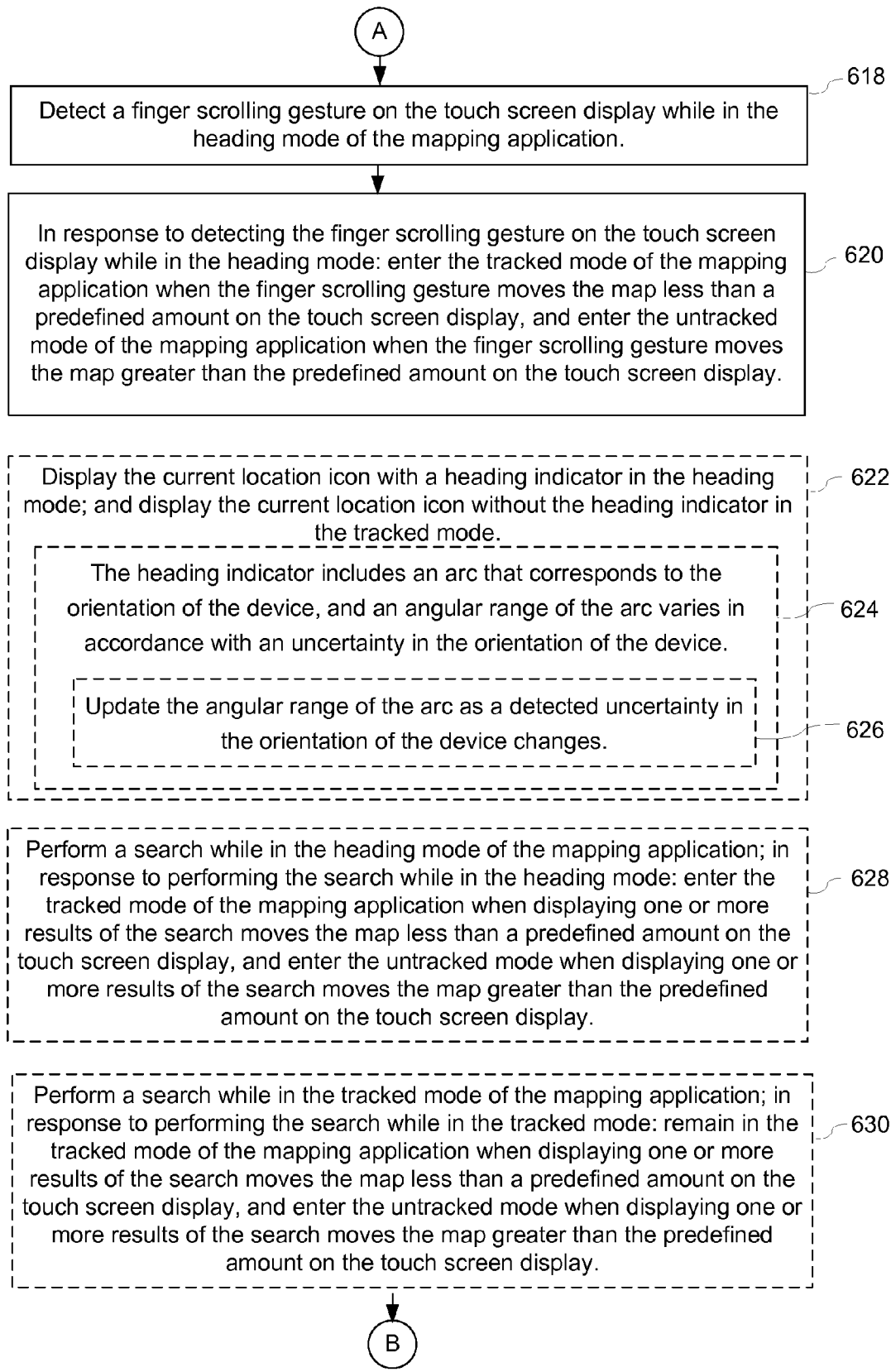

FIGS. 6A-6C are flow diagrams illustrating a method of changing between map viewing modes in accordance with some embodiments. The method 600 is performed at a portable electronic device with a touch screen display (e.g., device 100, FIG. 2). Some operations in method 600 may be combined and/or the order of some operations may be changed. In some embodiments, the contact/motion module 130 (FIG. 1B) detects user finger gestures on the touch screen display, and works with the mapping application 154 and data from the magnetometer 169 to control map display on the electronic device.

As described below, the method 600 provides an intuitive way to change map viewing modes, both in response to express user commands to change modes and in response to operations without express user commands to change modes (e.g., scrolling the map or searching). The method reduces the cognitive burden on a user when using a map application with multiple modes and multiple operations, thereby creating a more efficient human-machine interface. For battery-operated electronic devices, enabling a user to interpret and use a mapping application more quickly and efficiently conserves power and increases the time between battery charges.

The device displays (602) a map on the display in an untracked mode of a mapping application (see, e.g., UI 500A). The untracked mode comprises displaying the map on the display with an orientation that is independent of a current orientation of the portable electronic device.

The device receives (604) location information for the portable electronic device. For example, the device may receive information from GPS, nearby WiFi base stations, and/or nearby cell towers, as described in U.S. patent application Ser. Nos. 12/040,283, "Location Determination," filed Feb. 29, 2008; 12/103,330, "Location Determination Using Formula," filed Apr. 15, 2008; and 12/122,339, "Location Determination," filed May 16, 2008. All of these applications are incorporated by reference herein in their entirety.

The device detects (606) a first activation of a mapping mode user interface element (e.g., user gesture 510 at mapping mode user interface element 502, FIG. 5A). The device may detect a finger gesture such as a tap gesture on the element. The mapping mode user interface element may be a physical button or a soft button displayed on the touch screen display.

In some embodiments, the mapping mode user interface element is a physical button located outside the touch screen display (608), such as home button 204 on portable multifunction device 100, or any other suitable physical button.

In alternative embodiments, the mapping mode user interface element is a soft button on the touch screen display (610). In these embodiments the device may: display the mapping mode user interface element with a first appearance in the untracked mode of the mapping application; display the mapping mode user interface element with a second appearance in the tracked mode of the mapping application, wherein the second appearance is distinct from the first appearance; and display the mapping mode user interface element with a third appearance in the heading mode of the mapping application, wherein the third appearance is distinct from the first and second appearances (see, e.g., UI 500A mapping mode user interface element 502-1, UI 500B mapping mode user interface element 500-2, and UI 500C mapping mode user interface element 500-3).

In some embodiments, the mapping mode user interface element may comprise a plurality of soft buttons on the touch screen display (not depicted).

In response to detecting the first activation of the mapping mode user interface element, the device enters (612) a tracked mode of the mapping application (see, e.g., UI 500B). The tracked mode comprises the device displaying a current location icon 504 on the map that corresponds to a current location of the portable electronic device, and displaying the map on the display with an orientation that is independent of a current orientation of the portable electronic device (e.g., the orientation of the map is directed so that north is towards the top of the display). The tracked mode also includes the device maintaining the current location icon at a fixed or substantially fixed location on the touch screen display as the current location of the portable electronic device changes. For example, the device may keep the current location icon at or near the center of the displayed map. Here, a "substantially fixed" location means that the current location icon 504 will move no more than a predetermined number of pixels in any direction from the fixed location (e.g., 5, 10 or 20 pixels).

While in the tracked mode of the mapping application, the device detects (614) a second activation of the mapping mode user interface element (see, e.g., UI 500 B (FIG. 5B), user gesture 514 at mapping mode user interface element 502).

In response to detecting the second activation of the mapping mode user interface element, the device enters (616) a heading mode of the mapping application (e.g., UI 500C, FIG. 5C). In the heading mode, the device: displays the current location icon; displays the map on the display with an orientation that corresponds to the current orientation of the portable electronic device determined with the magnetometer 169; and maintains the current location icon at the substantially fixed location on the touch screen display as the current location of the portable electronic device changes. In some embodiments, other components of the device, such as the accelerometer(s) 168 may also be used to determine the orientation of the device.

Displaying the map on the display with an orientation that corresponds to the current orientation of the portable electronic device may include configuring the map display to be oriented so that the heading to a point of interest is in a given direction on the display. For example, the heading may be towards one edge of the display, such as the top edge.

While in the heading mode of the mapping application, the device detects (618) a finger scrolling gesture on the touch screen display (e.g., user gesture 520 or 522, FIG. 5D).

In response to detecting the finger scrolling gesture on the touch screen display while in the heading mode, the device enters the tracked mode of the mapping application when the finger scrolling gesture moves the map less than a predefined amount on the touch screen display (e.g., 5, 10, or 20 pixels) (see, e.g., gesture 520 (FIG. 5D) and UI 500E (FIG. 5E), which is in tracked mode). On the other hand, the device enters the untracked mode of the mapping application when the finger scrolling gesture moves the map greater than the predefined amount on the touch screen display (620) (see, e.g., gesture 522 (FIG. 5D) and UI 500F (FIG. 5F), which is in untracked mode).

In some embodiments, when the device leaves the heading mode and enters the tracked mode because the finger scrolling gesture moved the map less than a predefined amount on the touch screen display, the device also returns the current location icon, which may have moved in response to the finger scrolling gesture, to the substantially fixed location on the touch screen display (e.g., icon 504, FIG. 5E).

In some embodiments, the device displays the current location icon with a heading indicator in the heading mode, and the device displays the current location icon without the heading indicator in the tracked mode (622). See, e.g., UI 500D (FIG. 5D), which is in heading mode, where current location icon 504 is displayed with heading indicator 518 versus UI 500B (FIG. 5B), which is in tracked mode, where current location icon 504 is displayed without a heading indicator.

In some embodiments, the heading indicator includes an arc that corresponds to the orientation of the device, and an angular range of the arc varies in accordance with an uncertainty in the orientation of the device (624). Additionally, in some embodiments, the device updates the angular range of the arc as a detected uncertainty in the orientation of the device changes (626). For example, see the discussion above concerning heading indicator 518-1 (FIG. 5C) versus heading indicator 518-2 (FIG. 5D).

In some embodiments, while in the heading mode of the mapping application, the device performs a search in response to a user's request, and in response, the device either enters the tracked mode of the mapping application when displaying one or more results of the search moves the map less than a predefined amount on the touch screen display (e.g., 5, 10, or 20 pixels), or the device enters the untracked mode of the mapping application when displaying one or more results of the search moves the map greater than the predefined amount on the touch screen display (628). For example, see the discussion above of UI 500G-UI 500I (FIGS. 5G-5I), where search result 540 was near current location icon 504 and the mapping application entered the tracked mode in UI 500I, versus UI 500J-UI 500L (FIGS. 5J-5L), where search result 550-2 was far from current location icon 504 and the mapping application entered the untracked mode in UI 500L.

In some embodiments, entering the tracked mode in operation 628 (FIG. 6B) also returns the current location icon, which may have moved in response to the finger scrolling gesture, to the substantially fixed location on the touch screen display.

In some embodiments, while in the tracked mode of the mapping application, the device performs a search, and in response, the device either remains in the tracked mode of the mapping application when displaying one or more results of the search moves the map on the display less than a predefined amount on the touch screen display (e.g., 5, 10, or pixels), or the device enters the untracked mode of the mapping application when displaying one or more results of the search moves the map on the display greater than the predefined amount on the touch screen display (630). For example, see the discussion above of UI 500M-UI 500O (FIGS. 5M-5O), where the search result is less than a predefined distance from the current location icon 504 so the mapping application remains in tracked mode, versus UI 500O-UI 500Q (FIGS. 5O-5Q), where the search results are greater than a predefined distance from the current location icon 504 so the mapping application enters untracked mode.

In some embodiments, while in the mapping application, the device performs a search (e.g., UI 500P, search initiated by user gesture 560, FIG. 5P), receives one or more results of the search (e.g., UI 500Q, search results 550-1 and 550-2, FIG. 5Q), detects a user selection of a search result from the one or more results of the search (e.g., user gesture 562 at search result 550-2, FIG. 5Q), enters the heading mode (e.g., UI 500R, FIG. 5R) and displays the current location icon with a heading indicator in the heading mode (e.g., current location icon 504 and heading indicator 518-5, FIG. 5R). In these embodiments, the heading indicator includes an arc that corresponds to the orientation of the device, and an angular range of the arc varies in accordance with an orientation of the device with respect to the selected search result (632) (see, e.g., UI 500R heading indicator 518-5 and UI 500S heading indicator 518-6). In some of the embodiments, the device updates the angular range of the arc as the orientation of the device changes (634). In some embodiments, the device updates the angular range of the arc as the location of the device changes (636). For example, see the discussion above of heading indicator 518-5 and heading indicator 518-6 (FIGS. 5R & 5S).

In some embodiments, while in the mapping application, the device performs a search (e.g., UI 500P, search initiated by user gesture 560, FIG. 5P), receives one or more results of the search (e.g., UI 500Q, search results 550-1 and 550-2, FIG. 5Q), detects a user selection of a search result from the one or more results of the search (e.g., user gesture 562 at search result 550-2, FIG. 5Q), enters the heading mode (e.g., UI 500R, FIG. 5R) and displays the current location icon with a heading indicator in the heading mode (e.g., current location icon 504 and heading indicator 518-5, FIG. 5R). In these embodiments, the heading indicator includes an arc that corresponds to a current orientation of the device, and an angular range of the arc varies in accordance with the orientation of the device with respect to a route to the selected search result (e.g., a route from the current location of the device to the search result determined or suggested by the mapping application) (638). For example, see the arcs for heading indicator 518-5 (FIG. 5R) and heading indicator 518-6 (FIG. 5S), which vary as the location and/or orientation of the device changes with respect to route 564. In some of the embodiments, the device updates the angular range of the arc as the orientation of the device changes (640). In some embodiments, the device updates the angular range of the arc as the location of the device changes (642). For example, the angular range of the arc in heading indicator 518-5 and heading indicator 518-6 vary as the location and/or orientation of the device changes with respect to route 564.

In some embodiments, while in the heading mode of the mapping application, the device detects a third activation of the mapping mode button, and in response, the device enters the untracked mode of the mapping application (644) (e.g., user gesture 566 (FIG. 5S) and UI 500T (FIG. 5T), which is in untracked mode).

In some embodiments, while in the heading mode of the mapping application, the device detects a third activation of the mapping mode button, and in response, the device enters the tracked mode of the mapping application (646) (not shown).

In some embodiments, the device detects an initial finger contact on the touch-sensitive surface, and the device detects that the finger contact remains on the touch-sensitive surface for a predefined amount of time (e.g., a "tap-and-hold" gesture where the finger contact remains stationary or substantially stationary on the touch-sensitive surface). In response to detecting the tap-and-hold gesture on the touch-sensitive surface, the device enters the heading mode. Conversely, in response to detecting the finger contact lifting off of the touch-sensitive surface, the device leaves the heading mode and returns to the previous map viewing mode (e.g., the tracked mode). This tap-and-hold gesture allows a user to quickly toggle to heading mode, regardless of what other map viewing mode is being displayed.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A & 1B) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a portable electronic device with a touch screen display and a magnetometer:
     displaying a map on the display in an untracked mode of a mapping application, the untracked mode comprising displaying the map on the display with an orientation that is independent of a current orientation of the portable electronic device;
     receiving location information for the portable electronic device;
     detecting a first activation of a mapping mode user interface element;
     in response to detecting the first activation of the mapping mode user interface element, entering a tracked mode of the mapping application, the tracked mode comprising:
       displaying a current location icon on the map that corresponds to a current location of the portable electronic device;
       displaying the map on the display with an orientation that is independent of a current orientation of the portable electronic device; and
       maintaining the current location icon at a substantially fixed location on the touch screen display as the current location of the portable electronic device changes;
     while in the tracked mode of the mapping application, detecting a second activation of the mapping mode user interface element;
     in response to detecting the second activation of the mapping mode user interface element, entering a heading mode of the mapping application, the heading mode comprising:
       displaying the current location icon;
       displaying the map on the display with an orientation that corresponds to the current orientation of the portable electronic determined with the magnetometer; and
       maintaining the current location icon at the substantially fixed location on the touch screen display as the current location of the portable electronic device changes;
     while in the heading mode of the mapping application, detecting a finger scrolling gesture on the touch screen display;
     in response to detecting the finger scrolling gesture on the touch screen display while in the heading mode:
       entering the tracked mode of the mapping application when the finger scrolling gesture moves the map less than a predefined amount on the touch screen display, and
       entering the untracked mode of the mapping application when the finger scrolling gesture moves the map greater than the predefined amount on the touch screen display.

2. The method of claim 1, wherein the mapping mode user interface element is a soft button on the touch screen display, and further including:
   displaying the mapping mode user interface element with a first appearance in the untracked mode of the mapping application;
   displaying the mapping mode user interface element with a second appearance in the tracked mode of the mapping application, wherein the second appearance is distinct from the first appearance; and
   displaying the mapping mode user interface element with a third appearance in the heading mode of the mapping application, wherein the third appearance is distinct from the first appearance and the second appearance.

3. The method of claim 1, further including:
   displaying the current location icon with a heading indicator in the heading mode; and
   displaying the current location icon without the heading indicator in the tracked mode.

4. The method of claim 1, further including:
   while in the heading mode of the mapping application, performing a search;
   in response to performing the search while in the heading mode:
     entering the tracked mode of the mapping application when displaying one or more results of the search moves the map less than a predefined amount on the touch screen display, and
     entering the untracked mode of the mapping application when displaying one or more results of the search moves the map greater than the predefined amount on the touch screen display.

5. The method of claim 1, further including:
   while in the tracked mode of the mapping application, performing a search;
   in response to performing the search while in the tracked mode:
     remaining in the tracked mode of the mapping application when displaying one or more results of the search moves the map on the display less than a predefined amount on the touch screen display, and
     entering the untracked mode of the mapping application when displaying one or more results of the search moves the map on the display greater than the predefined amount on the touch screen display.

6. The method of claim 1, further including:
   while in the heading mode of the mapping application, detecting a third activation of the mapping mode button; and,
   in response to detecting the third activation of the mapping mode button, entering the untracked mode of the mapping application.

7. The method of claim 1, further including:
while in the heading mode of the mapping application, detecting a third activation of the mapping mode button; and,
in response to detecting the third activation of the mapping mode button, entering the tracked mode of the mapping application.

8. A portable electronic device, comprising:
a touch screen display;
one or more processors;
memory; and
one or more programs, wherein the one or more programs are stored in the memory and configured to be executed by the one or more processors, the one or more programs including instructions for:
displaying a map on the display in an untracked mode of a mapping application, the untracked mode comprising displaying the map on the display with an orientation that is independent of a current orientation of the portable electronic device;
receiving location information for the portable electronic device;
detecting a first activation of a mapping mode user interface element;
in response to detecting the first activation of the mapping mode user interface element, entering a tracked mode of the mapping application, the tracked mode comprising:
displaying a current location icon on the map that corresponds to a current location of the portable electronic device;
displaying the map on the display with an orientation that is independent of a current orientation of the portable electronic device; and
maintaining the current location icon at a substantially fixed location on the touch screen display as the current location of the portable electronic device changes;
while in the tracked mode of the mapping application, detecting a second activation of the mapping mode user interface element;
in response to detecting the second activation of the mapping mode user interface element, entering a heading mode of the mapping application, the heading mode comprising:
displaying the current location icon;
displaying the map on the display with an orientation that corresponds to the current orientation of the portable electronic determined with the magnetometer; and
maintaining the current location icon at the substantially fixed location on the touch screen display as the current location of the portable electronic device changes;
while in the heading mode of the mapping application, detecting a finger scrolling gesture on the touch screen display;
in response to detecting the finger scrolling gesture on the touch screen display while in the heading mode:
entering the tracked mode of the mapping application when the finger scrolling gesture moves the map less than a predefined amount on the touch screen display, and
entering the untracked mode of the mapping application when the finger scrolling gesture moves the map greater than the predefined amount on the touch screen display.

9. The portable electronic device of claim 8, wherein the mapping mode user interface element is a soft button on the touch screen display, and further including instructions for:
displaying the mapping mode user interface element with a first appearance in the untracked mode of the mapping application;
displaying the mapping mode user interface element with a second appearance in the tracked mode of the mapping application, wherein the second appearance is distinct from the first appearance; and
displaying the mapping mode user interface element with a third appearance in the heading mode of the mapping application, wherein the third appearance is distinct from the first appearance and the second appearance.

10. The portable electronic device of claim 8, further including instructions for:
displaying the current location icon with a heading indicator in the heading mode; and
displaying the current location icon without the heading indicator in the tracked mode.

11. The portable electronic device of claim 8, further including instructions for:
while in the heading mode of the mapping application, performing a search;
in response to performing the search while in the heading mode:
entering the tracked mode of the mapping application when displaying one or more results of the search moves the map less than a predefined amount on the touch screen display, and
entering the untracked mode of the mapping application when displaying one or more results of the search moves the map greater than the predefined amount on the touch screen display.

12. The portable electronic device of claim 8, further including instructions for:
while in the tracked mode of the mapping application, performing a search;
in response to performing the search while in the tracked mode:
remaining in the tracked mode of the mapping application when displaying one or more results of the search moves the map on the display less than a predefined amount on the touch screen display, and
entering the untracked mode of the mapping application when displaying one or more results of the search moves the map on the display greater than the predefined amount on the touch screen display.

13. The portable electronic device of claim 8, further including instructions for:
while in the heading mode of the mapping application, detecting a third activation of the mapping mode button; and,
in response to detecting the third activation of the mapping mode button, entering the untracked mode of the mapping application.

14. The portable electronic device of claim 8, further including instructions for:
while in the heading mode of the mapping application, detecting a third activation of the mapping mode button; and,
in response to detecting the third activation of the mapping mode button, entering the tracked mode of the mapping application.

15. A non-transitory computer readable storage medium storing one or more programs, the one or more programs comprising instructions, which when executed by a portable electronic device with a touch screen display, cause the device to:
> display a map on the display in an untracked mode of a mapping application, the untracked mode comprising displaying the map on the display with an orientation that is independent of a current orientation of the portable electronic device;
> receive location information for the portable electronic device;
> detect a first activation of a mapping mode user interface element;
> in response to detecting the first activation of the mapping mode user interface element, enter a tracked mode of the mapping application, the tracked mode comprising:
> > display a current location icon on the map that corresponds to a current location of the portable electronic device;
> > display the map on the display with an orientation that is independent of a current orientation of the portable electronic device; and
> > maintain the current location icon at a substantially fixed location on the touch screen display as the current location of the portable electronic device changes;
> while in the tracked mode of the mapping application, detect a second activation of the mapping mode user interface element;
> in response to detecting the second activation of the mapping mode user interface element, enter a heading mode of the mapping application, the heading mode comprising:
> > display the current location icon;
> > display the map on the display with an orientation that corresponds to the current orientation of the portable electronic determined with the magnetometer; and
> > maintain the current location icon at the substantially fixed location on the touch screen display as the current location of the portable electronic device changes;
> while in the heading mode of the mapping application, detect a finger scrolling gesture on the touch screen display;
> in response to detecting the finger scrolling gesture on the touch screen display while in the heading mode:
> > enter the tracked mode of the mapping application when the finger scrolling gesture moves the map less than a predefined amount on the touch screen display, and
> > enter the untracked mode of the mapping application when the finger scrolling gesture moves the map greater than the predefined amount on the touch screen display.

16. The non-transitory computer readable storage medium of claim 15, wherein the mapping mode user interface element is a soft button on the touch screen display, and further including instructions which cause the device to:
> display the mapping mode user interface element with a first appearance in the untracked mode of the mapping application;
> display the mapping mode user interface element with a second appearance in the tracked mode of the mapping application, wherein the second appearance is distinct from the first appearance; and
> display the mapping mode user interface element with a third appearance in the heading mode of the mapping application, wherein the third appearance is distinct from the first appearance and the second appearance.

17. The non-transitory computer readable storage medium of claim 15, further including instructions which cause the device to:
> display the current location icon with a heading indicator in the heading mode; and
> display the current location icon without the heading indicator in the tracked mode.

18. The non-transitory computer readable storage medium of claim 15, further including instructions which cause the device to:
> while in the heading mode of the mapping application, perform a search;
> in response to performing the search while in the heading mode:
> > enter the tracked mode of the mapping application when displaying one or more results of the search moves the map less than a predefined amount on the touch screen display, and
> > enter the untracked mode of the mapping application when displaying one or more results of the search moves the map greater than the predefined amount on the touch screen display.

19. The non-transitory computer readable storage medium of claim 15, further including instructions which cause the device to:
> while in the tracked mode of the mapping application, perform a search;
> in response to performing the search while in the tracked mode:
> > remain in the tracked mode of the mapping application when displaying one or more results of the search moves the map on the display less than a predefined amount on the touch screen display, and
> > enter the untracked mode of the mapping application when displaying one or more results of the search moves the map on the display greater than the predefined amount on the touch screen display.

20. The non-transitory computer readable storage medium of claim 15, further including instructions which cause the device to:
> while in the heading mode of the mapping application, detect a third activation of the mapping mode button; and,
> in response to detecting the third activation of the mapping mode button, enter the untracked mode of the mapping application.

21. The non-transitory computer readable storage medium of claim 15, further including instructions which cause the device to:
> while in the heading mode of the mapping application, detect a third activation of the mapping mode button; and,
> in response to detecting the third activation of the mapping mode button, enter the tracked mode of the mapping application.

* * * * *